US012734448B2

(12) United States Patent
Mineta et al.

(10) Patent No.: US 12,734,448 B2
(45) Date of Patent: Sep. 15, 2026

(54) COMPUTER-READABLE NON-TRANSITORY STORAGE MEDIUM HAVING GAME PROGRAM STORED THEREIN, GAME PROCESSING SYSTEM, GAME PROCESSING APPARATUS, AND GAME PROCESSING METHOD

(71) Applicant: NINTENDO CO., LTD., Kyoto (JP)

(72) Inventors: Naoki Mineta, Kyoto (JP); Tatsuya Shinada, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 282 days.

(21) Appl. No.: 18/418,602

(22) Filed: Jan. 22, 2024

(65) Prior Publication Data

US 2025/0090955 A1 Mar. 20, 2025

(30) Foreign Application Priority Data

Sep. 14, 2023 (JP) ................................ 2023-149370

(51) Int. Cl.
*A63F 13/56* (2014.01)
*A63F 13/525* (2014.01)
*A63F 13/57* (2014.01)

(52) U.S. Cl.
CPC ............ *A63F 13/57* (2014.09); *A63F 13/525* (2014.09)

(58) Field of Classification Search
None
See application file for complete search history.

(56) References Cited

U.S. PATENT DOCUMENTS 9,443,340 B2 * 9/2016 Miyagi .................... G06T 15/20
11,219,829 B2 * 1/2022 Yonezu .................... G06T 15/20
11,645,811 B2 * 5/2023 Nishida ..................... G06T 5/20 345/419
2012/0127158 A1 5/2012 Miyagi
2020/0298117 A1 9/2020 Yonezu et al.
2021/0038984 A1 2/2021 Dohta et al.
2023/0076624 A1 * 3/2023 Nemoto .................. A63F 13/56
2024/0238674 A1 7/2024 Matsunaga

FOREIGN PATENT DOCUMENTS

JP 2002-200330 7/2002
JP 2007-226576 9/2007
JP 2010-033297 2/2010
JP 2011-101752 5/2011
JP 2013-171539 9/2013

(Continued)

OTHER PUBLICATIONS

Nintendo Donkey Kong Country Returns Wii, Wikipedia, Nov. 2010, pp. 1-23 (Year: 2010).*

(Continued)

*Primary Examiner* — Sunit Pandya
(74) *Attorney, Agent, or Firm* — Nixon & Vanderhye PC

(57) ABSTRACT

On the basis of orthographic projection, objects in a virtual space are drawn in a frame buffer, and further, in a first scene in a game, drawing is performed while transformation is performed by a vertex shader such that, among the objects in the virtual space, at least a player character object and one or some of the terrain objects are moved to a near side and are enlarged, or are moved to a far side and are reduced.

24 Claims, 20 Drawing Sheets

(56) References Cited

FOREIGN PATENT DOCUMENTS

| | | | |
|---|---|---|---|
| JP | 5643617 | B2 | 11/2014 |
| JP | 2019-121193 | | 7/2019 |
| JP | 2020-154923 | | 9/2020 |
| JP | 2020-189064 | | 11/2020 |
| JP | 2021-028752 | | 2/2021 |
| JP | 2021-111129 | | 8/2021 |
| JP | 2023-099961 | | 7/2023 |
| WO | 2023/054596 | | 4/2023 |

OTHER PUBLICATIONS

Nintendo Donkey Kong Country Returns Wii, Wikipedia (Year: 2010).*
Dec. 17, 2024 Decision to Grant issued in Japanese Patent Application No. 2023-149370, 4 pages.
Dec. 17, 2024 Decision to Grant issued in Japanese Patent Application No. 2023-149370, 3 pages.
Oct. 15, 2024 Office Action issued in Japanese Patent Application No. 2023-149370, pp. 1-18 [machine translation included].
Jul. 4, 2024 Search Report issued in European Patent Application No. 24153725.7, pp. 1-10.
Jan. 2, 2026 Office Action issued in European Patent Application No. 24153725.7, pp. 1-9.

* cited by examiner

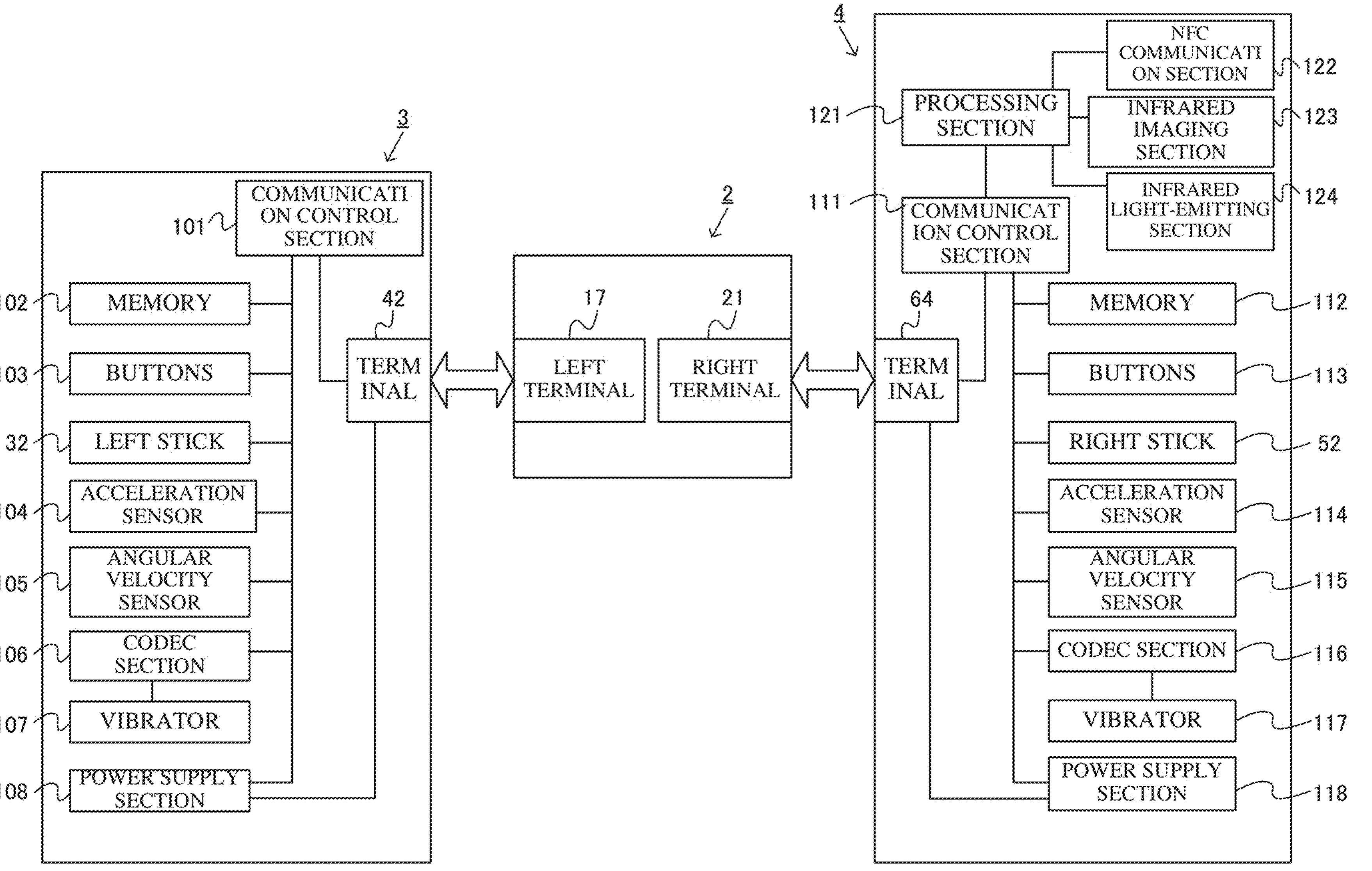
FIG.3
3
101
COMMUNICATION CONTROL SECTION
42
TERMINAL
102
MEMORY
103
BUTTONS
32
LEFT STICK
104
ACCELERATION SENSOR
105
ANGULAR VELOCITY SENSOR
106
CODEC SECTION
107
VIBRATOR
108
POWER SUPPLY SECTION
2
17
LEFT TERMINAL
21
RIGHT TERMINAL
4
121
PROCESSING SECTION
122
NFC COMMUNICATION SECTION
123
INFRARED IMAGING SECTION
124
INFRARED LIGHT-EMITTING SECTION
111
COMMUNICATION CONTROL SECTION
64
TERMINAL
112
MEMORY
113
BUTTONS
52
RIGHT STICK
114
ACCELERATION SENSOR
115
ANGULAR VELOCITY SENSOR
116
CODEC SECTION
117
VIBRATOR
118
POWER SUPPLY SECTION GAME SCREEN ( ORTHOGRAPHIC PROJECTION )
12
A
B
C
200
201
201
201
201
201
202
203
204
205
210
210
210
x
y
z (OBJECT ARRANGEMENT IN GAME SPACE)

FIG.6

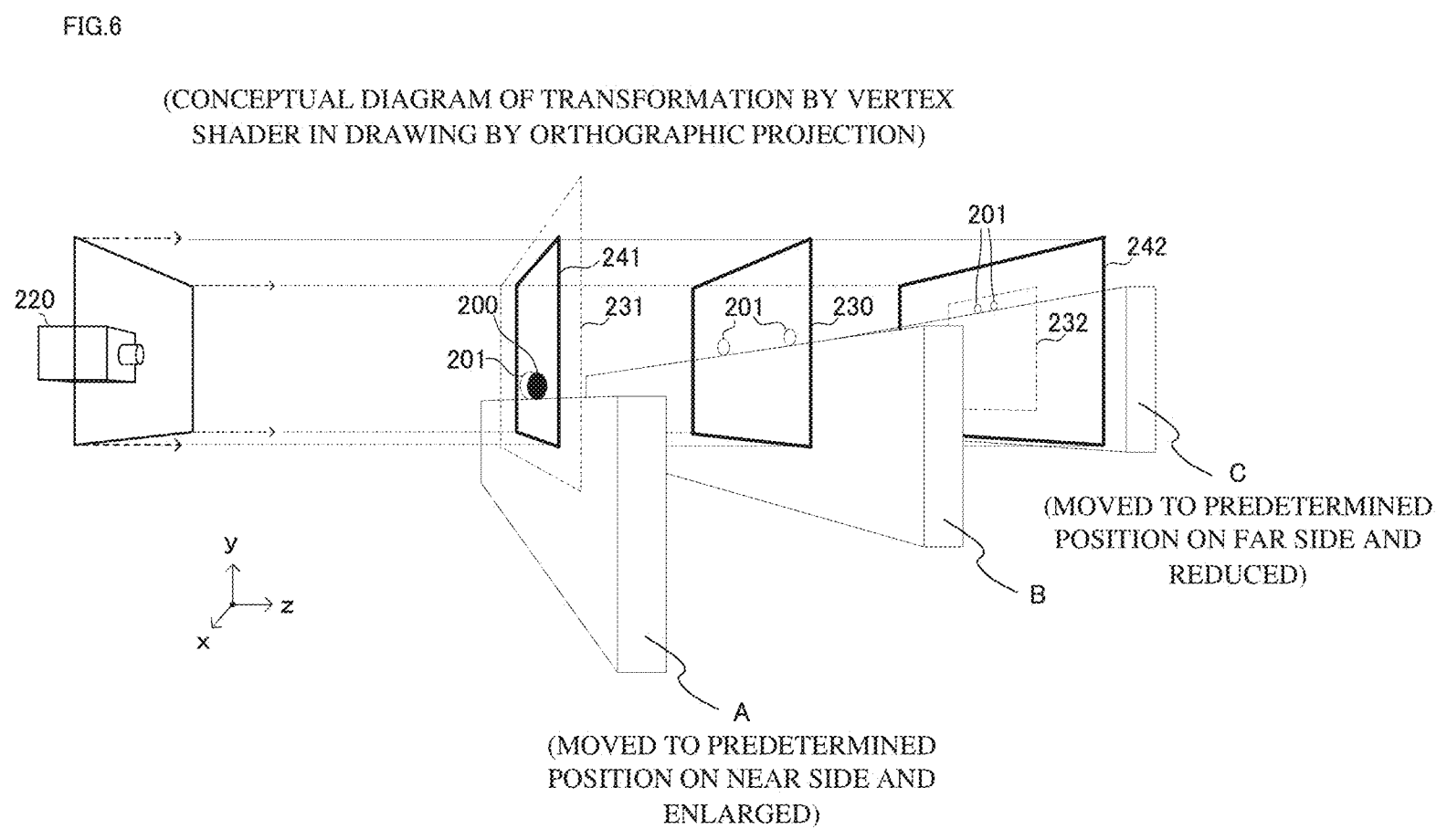

(CONCEPTUAL DIAGRAM OF TRANSFORMATION BY VERTEX SHADER IN DRAWING BY ORTHOGRAPHIC PROJECTION)

220

200

201

241

231

230

201

201

232

242

A (MOVED TO PREDETERMINED POSITION ON NEAR SIDE AND ENLARGED)

B

C (MOVED TO PREDETERMINED POSITION ON FAR SIDE AND REDUCED)

y z x

GAME SCREEN (ORTHOGRAPHIC PROJECTION)
12
A
B
C
200
201
202
203
204
205
210
x
y
z (1) PLAYER CHARACTER GOES INTO ENTRANCE/EXIT
12
210
210
210
201
201
204
C
201
201
202
203
B
(2) TERRAIN OBJECT ON NEAR SIDE APPEARS AND PLAYER CHARACTER COMES OUT FROM ENTRANCE/EXIT
12
210
210
210
201
201
204
C
201
201
202
203
B
200
201
205
A
y
x
z

FIG.12

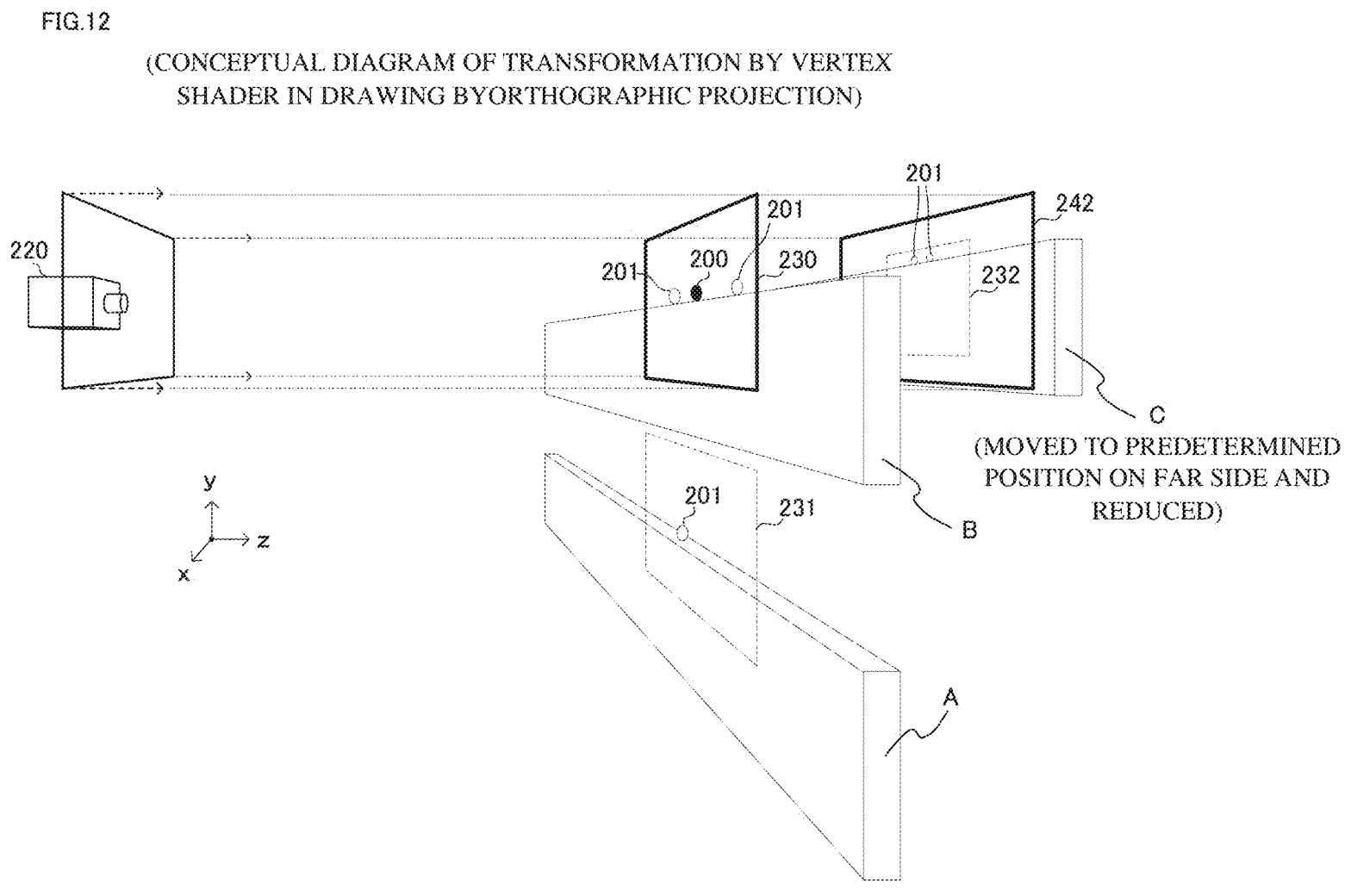

(CONCEPTUAL DIAGRAM OF TRANSFORMATION BY VERTEX SHADER IN DRAWING BYORTHOGRAPHIC PROJECTION)

(MOVED TO PREDETERMINED POSITION ON FAR SIDE AND REDUCED)

Figure 14:
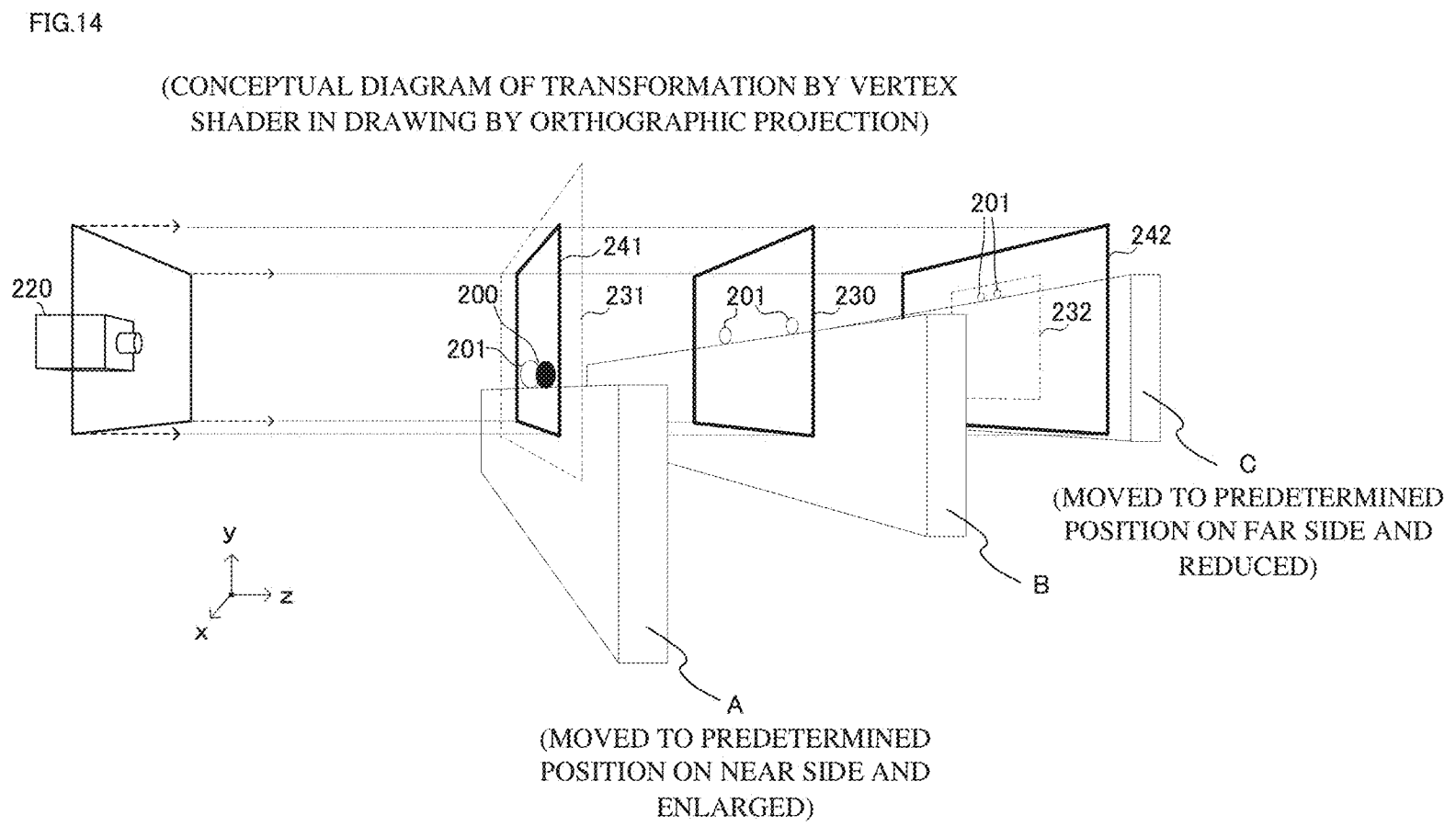

(CONCEPTUAL DIAGRAM OF TRANSFORMATION BY VERTEX SHADER IN DRAWING BY ORTHOGRAPHIC PROJECTION)

220
200
201
241
231
230
201
242
232
201
A
(MOVED TO PREDETERMINED POSITION ON NEAR SIDE AND ENLARGED)
B
C
(MOVED TO PREDETERMINED POSITION ON FAR SIDE AND REDUCED)
y
z
x 85
301
PROGRAM STORAGE AREA
401
GAME PROGRAM
302
DATA STORAGE AREA
402
GAME CONTROL DATA
403
OBJECT DATA
408
IMAGE DATA
409
VIRTUAL CAMERA CONTROL DATA
410
OPERATION DATA
411
TRANSMISSION DATA
412
RECEIVED DATA

START
S100
GAME PROCESSING
(CPU; PROCESSING IN GAME SPACE)
S200
DRAWING PROCESSING
(GPU; PROCESSING SUCH AS
MOVEMENT AND ENLARGEMENT/
REDUCTION FOR OBJECTS BY
VERTEX SHADER)
S300
DISPLAY IMAGE

FIG.20

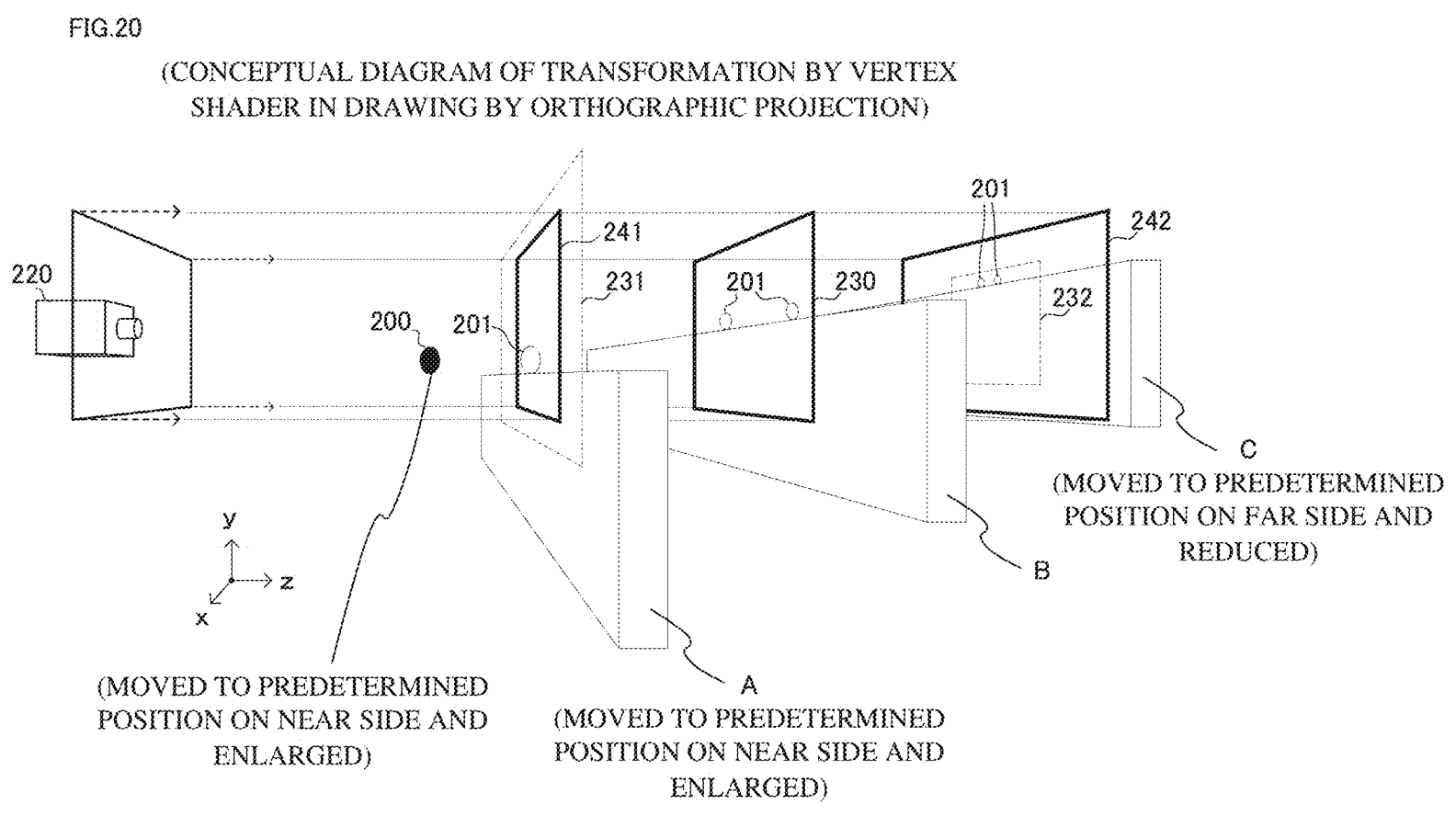

(CONCEPTUAL DIAGRAM OF TRANSFORMATION BY VERTEX SHADER IN DRAWING BY ORTHOGRAPHIC PROJECTION)

220
200
201
241
231
201
230
201
242
232
y
z
x
C
(MOVED TO PREDETERMINED POSITION ON FAR SIDE AND REDUCED)
B
A
(MOVED TO PREDETERMINED POSITION ON NEAR SIDE AND ENLARGED)
(MOVED TO PREDETERMINED POSITION ON NEAR SIDE AND ENLARGED)

COMPUTER-READABLE NON-TRANSITORY STORAGE MEDIUM HAVING GAME PROGRAM STORED THEREIN, GAME PROCESSING SYSTEM, GAME PROCESSING APPARATUS, AND GAME PROCESSING METHOD

CROSS REFERENCE TO RELATED APPLICATION

This application claims priority to Japanese Patent Application No. 2023-149370 filed on Sep. 14, 2023, the entire contents of which are incorporated herein by reference.

FIELD

The present disclosure relates to information processing of a game or the like.

BACKGROUND AND SUMMARY

Conventionally, there have been games in which a game space is drawn by orthographic projection and is side-scrolled.

In a case of drawing a game space by orthographic projection, a character placed on a near side or a far side relative to a normal position is not changed in apparent size, and therefore such an image expression that the character sufficiently appears to be on the near side or the far side has been required.

Accordingly, an object of the exemplary embodiment is to provide a computer-readable non-transitory storage medium having a game program stored therein, a game processing system, a game processing apparatus, and a game processing method that enable such an image expression that a character sufficiently appears to be on a near side or a far side while a game space is drawn by orthographic projection.

Configuration examples for achieving the above object will be shown below.

A first configuration example is a computer-readable non-transitory storage medium having stored therein instructions that, when executed by a processor of the information processing apparatus, cause the information processing apparatus to: in a virtual space where at least a player character object and terrain objects are placed, control at least the player character object and a virtual camera; and draw, in a frame buffer, objects in the virtual space, on the basis of orthographic projection, and further, in a first scene in a game, perform drawing while performing, by a vertex shader, such transformation that, among the objects in the virtual space, at least the player character object and one or some of the terrain objects are moved to a near side and are enlarged, or are moved to a far side and are reduced.

According to the above first configuration example, objects are enlarged or reduced by the vertex shader in drawing the virtual space by orthographic projection. Thus, a scene in which the objects are placed on the near side or the far side can be expressed, whereby a sense of depth in the game image can be effectively provided. In addition, without enlarging or reducing the objects present in the virtual space, the objects are enlarged or reduced by the vertex shader in drawing the virtual space. Thus, it is not necessary to correct game processing for collision detection or the like in accordance with enlargement or reduction of the objects present in the virtual space.

In a second configuration example based on the first configuration example, the instructions cause the information processing apparatus to: cause a first terrain object to appear in a case where a first condition in the game is satisfied on the basis of control for the player character object; and in the first scene that is a subsequent scene, perform drawing while performing the transformation for the player character object and the first terrain object.

According to the above second configuration example, it is possible to express such a game image that the player character moves on the terrain object that newly appears on the near side or the far side.

In a third configuration example based on the first configuration example, the instructions cause the information processing apparatus to: draw, in the frame buffer, the objects in the virtual space, on the basis of orthographic projection, and further, perform drawing while performing the transformation for a second terrain object among the objects in the virtual space; move the player character object in a case where a second condition in the game is satisfied on the basis of control for the player character object; and in the first scene that is a subsequent scene, further perform drawing while performing the transformation for the player character object.

According to the above third configuration example, it is possible to express such a game image that the player character moves onto the terrain object that has already been placed on the near side or the far side.

In a fourth configuration example based on the first configuration example, the instructions cause the information processing apparatus to: draw, in the frame buffer, the objects in the virtual space, while performing a depth test; and on an image drawn in the frame buffer, further impart, on the basis of a depth in a depth buffer, a predetermined effect that is based on a pixel in a second range excluding a first range in which the depth is small.

According to the above fourth configuration example, the predetermined effect can be imparted only in a far-side range of the game image. In addition, characters moved to and drawn on the far side are also subjected to the predetermined effect, whereby a sense of depth can be provided.

In a fifth configuration example based on the fourth configuration example, the predetermined effect is a bloom effect.

According to the above fifth configuration example, a bloom effect with a sense of depth can be provided.

In a sixth configuration example based on the fifth configuration example, the instructions cause the information processing apparatus to: in a case of adding a color to a pixel in the first range by the bloom effect that is based on the pixel in the second range, correct the color to be added, on the basis of at least exponentiation, and then add the corrected color.

According to the above sixth configuration example, a bloom effect with an increased sense of depth can be provided.

According to the exemplary embodiments, it is possible to provide a computer-readable non-transitory storage medium having a game program stored therein, a game processing system, a game processing apparatus, and a game processing method that enable such an image expression that a character sufficiently appears to be on a near side or a far side while a game space is drawn by orthographic projection.

BRIEF DESCRIPTION OF THE DRAWINGS

FIG. 3 is a block diagram showing a non-limiting example of the internal configurations of the main body apparatus 2, the left controller 3, and the right controller 4;

FIG. 6 is a non-limiting example of a conceptual diagram of transformation by a vertex shader in drawing by orthographic projection;

FIG. 12 is a non-limiting example of a conceptual diagram of transformation by a vertex shader in drawing by orthographic projection;

FIG. 14 is a non-limiting example of a conceptual diagram of transformation by a vertex shader in drawing by orthographic projection;

FIG. 18 is a non-limiting example of a flowchart of game processing, drawing processing, and the like;

FIG. 20 shows a non-limiting example of a conceptual diagram of transformation by a vertex shader in drawing by orthographic projection.

DETAILED DESCRIPTION OF NON-LIMITING EXAMPLE EMBODIMENTS

Hereinafter, an exemplary embodiment will be described.

[Hardware Configuration of Information Processing System]

Hereinafter, an information processing system (game system/game apparatus) according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. Hereinafter, first, the hardware configuration of the game system 1 according to the exemplary embodiment will be described, and then, the control of the game system 1 according to the exemplary embodiment will be described.

Figure 1:
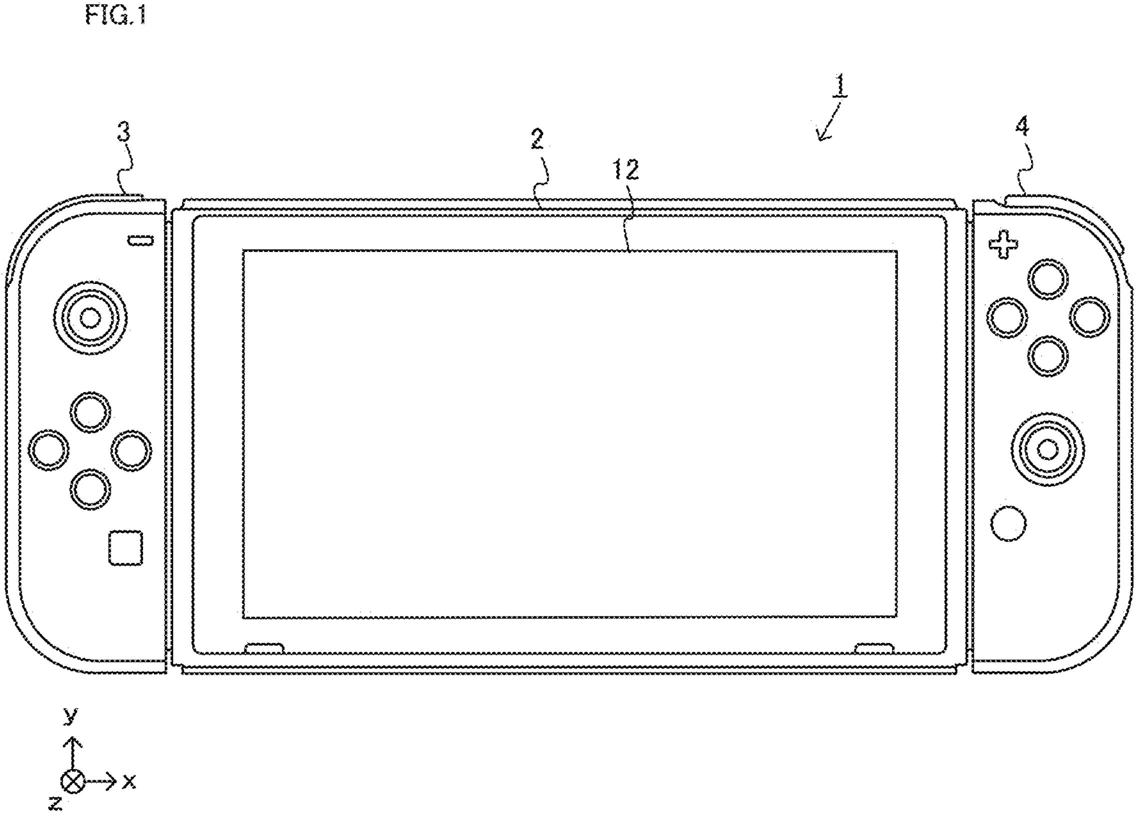
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes in the game system 1. The main body apparatus 2 includes a display 12. Each of the left controller 3 and the right controller 4 is an apparatus including operation sections with which a user provides inputs.

The main body apparatus 2 also includes speakers 88, and sounds such as sound effects are outputted from the speakers 88.

The main body apparatus 2 also includes a left terminal 17 for the main body apparatus 2 to perform wired communication with the left controller 3, and a right terminal 21 for the main body apparatus 2 to perform wired communication with the right controller 4.

The main body apparatus 2 also includes a slot 23. The slot 23 is provided on an upper side surface of a housing of the main body apparatus 2. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2.

Each of the left controller 3 and the right controller 4 includes various operation buttons, etc. The various operation buttons, etc., are used to give instructions according to various programs (e.g., an OS program and an application program) executed by the main body apparatus 2.

Each of the left controller 3 and the right controller 4 also includes a terminal 42 or 64 for performing wired communication with the main body apparatus 2.

Figure 2:
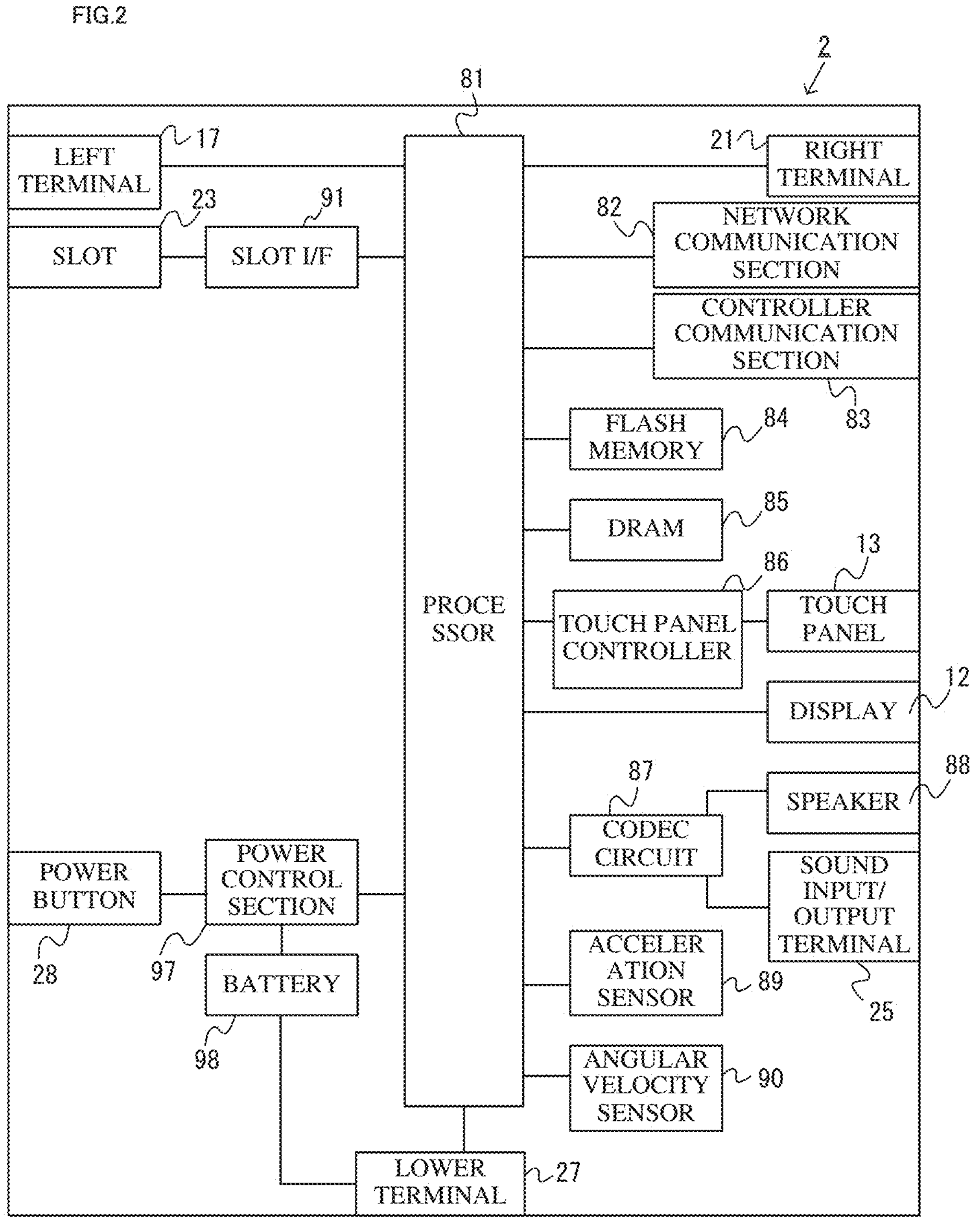
FIG. 2 is a block diagram showing a non-limiting example of the internal configuration of the main body apparatus 2.

FIG. 2 is a block diagram showing an example of the internal configuration of the main body apparatus 2. The main body apparatus 2 includes a processor 81. The processor 81 is an information processing section for executing various types of information processing to be executed by the main body apparatus 2. For example, the processor 81 may be composed of a SoC (System-on-a-chip) having a plurality of functions such as a CPU (Central Processing Unit) function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, the network communication section 82 connects to a wireless LAN by a method compliant with the Wi-Fi standard, for example, and performs Internet communication or the like with an external apparatus (another main body apparatus 2). Further, the network communication section 82 can also perform short-range wireless communication (e.g., infrared light communication) with another main body apparatus 2.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the above left terminal 17, the above right terminal 21, and a lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with a cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2, or the main body apparatus 2 alone, is attached to the cradle, the main body apparatus 2 can output data (e.g., image data or sound data) to the stationary monitor or the like via the cradle.

The main body apparatus 2 includes a touch panel controller 86, which is a circuit for controlling a touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and the speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

FIG. 3 is a block diagram showing examples of the internal configurations of the main body apparatus 2, the left controller 3, and the right controller 4. It should be noted that the details of the internal configuration of the main body apparatus 2 are shown in FIG. 2 and therefore are omitted in FIG. 3.

The left controller 3 includes a communication control section 101, which communicates with the main body apparatus 2. As shown in FIG. 3, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

The left controller 3 also includes a memory 102 such as a flash memory. The communication control section 101 includes, for example, a microcomputer (or a microprocessor) and executes firmware stored in the memory 102, thereby performing various processes.

The left controller 3 includes buttons 103. The left controller 3 also includes a left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 1) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 1). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation, or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown, the power control circuit is connected to the battery and also connected to components of the left controller 3 (specifically, components that receive power supplied from the battery).

As shown in FIG. 3, the right controller 4 includes a communication control section 111, which communicates with the main body apparatus 2. The right controller 4 also includes a memory 112 which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, a right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Game Assumed in Exemplary Embodiment]

Next, the outline of game processing (example of information processing) executed by the game system 1 according to the exemplary embodiment will be described. A game assumed in the exemplary embodiment is such an action game that, in a virtual space (game space) where various objects are placed, a player character object (which may be referred to as a "player character") acting in accordance with an operation by a player (user) moves to reach a goal point. In this game, an image of the game space is taken by a virtual camera using orthographic projection (parallel projection), and a game image as in a two-dimensional game is displayed on a screen (display 12). This game is not limited to such an action game and may be another type of game.

[Outline of Game Processing and Drawing Processing in Exemplary Embodiment]

Figure 4:
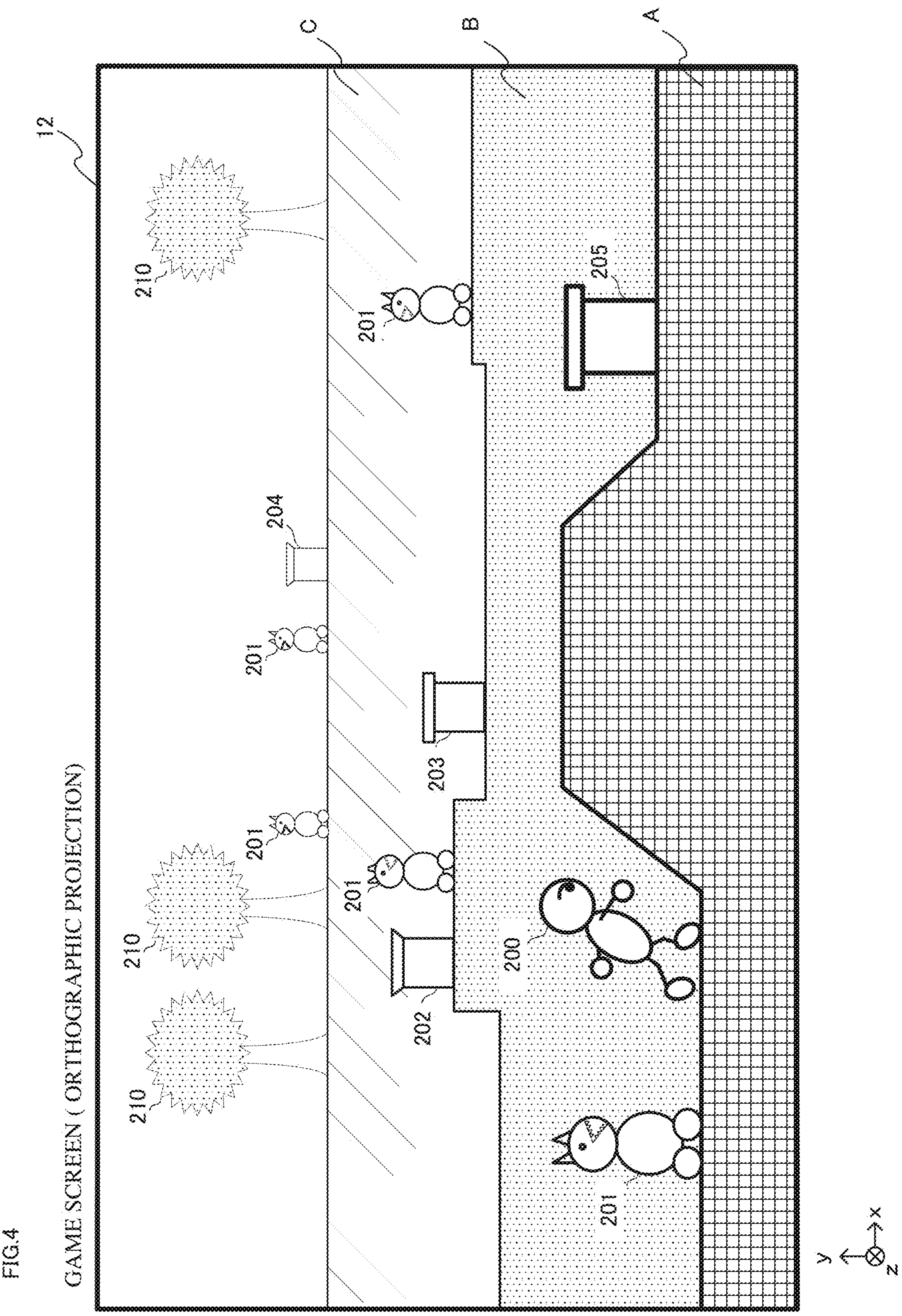
FIG. 4 illustrates a non-limiting example of a game screen.

FIG. 4 shows an example of a game screen in this game. As shown in FIG. 4, a terrain object A, a terrain object B, and a terrain object C are displayed on the game screen. On the terrain object A, one enemy character object (which may be referred to as an "enemy character") 201, one player character 200, and one entrance/exit object (which may be simply referred to as an "entrance/exit") 205 are displayed. On the terrain object B, two enemy characters 201, one entrance/exit 202, and one entrance/exit 203 are displayed. On the terrain object C, two enemy characters 201, one entrance/exit 204, and three tree objects (which may be simply referred to as "trees") 210 are displayed. The terrain object A and an object displayed on the terrain object A may be referred to as a "layer A", the terrain object B and an object displayed on the terrain object B may be referred to as a "layer B", and the terrain object C and an object displayed on the terrain object C may be referred to as a "layer C".

The player operates the player character 200 to move the player character 200, heading toward a goal point (not shown) located rightward (in an increase direction of x axis). In addition, as the player character 200 moves rightward or leftward in accordance with a player's operation, the layer A, the layer B, and the layer C are displayed while being side-scrolled so that the player character 200 does not go out of the display range of the screen. When the player character 200 contacts with the enemy character 201, the player character 200 takes damage.

The enemy characters 201 are the same kind of enemy characters and have the same size in the game space. The trees 210 are also the same kind of trees and have the same size in the game space. The entrance/exit 203 and the entrance/exit 205 have the same size in the game space, and the entrance/exits 202 and 204 also have the same size in the game space.

As shown in FIG. 4, on the game screen in this game, the layer A displayed on the nearest side is displayed in an enlarged manner, and the layer C displayed on the farthest side is displayed in a reduced manner. In this way, it is possible to display a game image with a sense of depth while an image of the game space is taken by orthographic projection. In a conventional method, when an image of a game space is taken by orthographic projection, a layer on a near side and a layer on a far side are displayed in the same size (same magnification), so that a sense of depth as in FIG. 4 is not provided.

Figure 5:
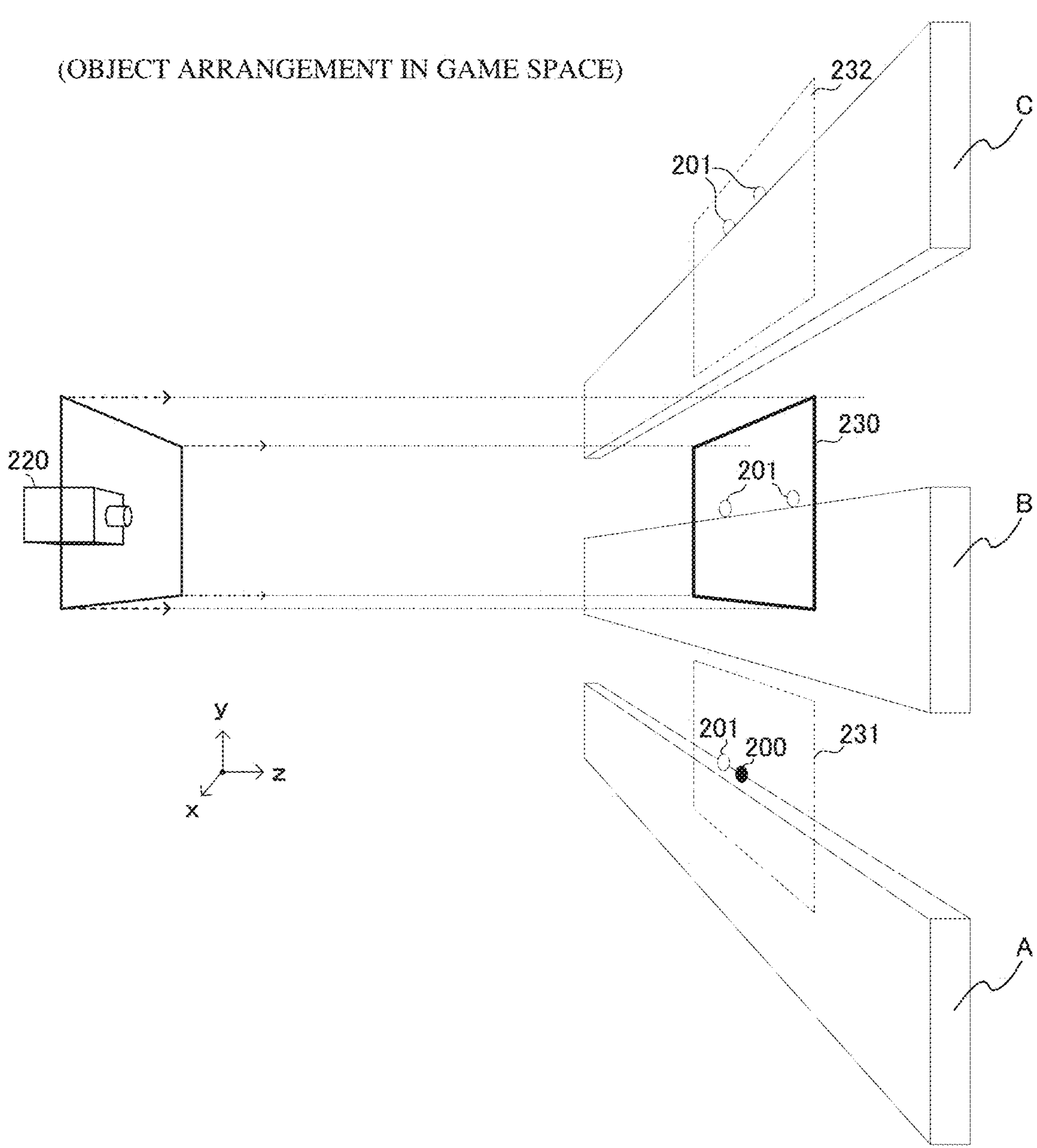
FIG. 5 illustrates a non-limiting example of a game space.

FIG. 5 illustrates the game space whose image is taken for drawing the game screen (game image) shown in FIG. 4. As shown in FIG. 5, in the game space, a virtual camera 220 and the terrain objects A to C are placed. The terrain objects A to C are arranged so as to be aligned in the up-down direction (y-axis direction) at an equal depth position (same distance in the z direction) from the virtual camera 220, in the game space. On the upper side (increase direction of y axis) of the terrain object A, one enemy character 201 and one player character 200 are placed. On the upper side of the terrain object B, two enemy characters 201 are placed. On the upper side of the terrain object C, two enemy characters 201 are placed. In FIG. 5, for convenience sake, the terrain objects are shown in plate shapes, the enemy characters 201 and the player character 200 are shown in elliptic shapes, and objects such as the trees and the entrance/exits are not shown. In the example in FIG. 5, the depths of the terrain objects A to C in the game space and the depths of the characters on the terrain objects are the same, but may be different from each other.

In FIG. 5, a rectangular area 230 of the terrain object B whose image is taken by the virtual camera 220 using orthographic projection, is shown. In addition, a rectangular area 231 having the same size as the area 230 is shown at the terrain object A, and a rectangular area 232 having the same size as the area 230 is shown at the terrain object C.

Here, in a case of taking an image using orthographic projection in a conventional method, although not shown, it is necessary to take an image (draw an image in a frame buffer) in a state in which the layer A (the terrain object A and objects placed thereon) is placed on the near side of the layer B (the terrain object B and objects placed thereon) as seen from the virtual camera 220, the layer C (the terrain object C and objects placed thereon) is placed on the far side of the layer B as seen from the virtual camera 220, and the layers A to C are all included in the field of view of the virtual camera (i.e., the area 230, the area 231, and the area 232 are overlapped as seen from the virtual camera), in the game space.

FIG. 6 illustrates transformation performed by a vertex shader in drawing the game space shown in FIG. 5 in a frame buffer (in a process of drawing). As shown in FIG. 6, in the drawing processing in the exemplary embodiment, by the vertex shader, the layer A is moved to a predetermined position on the near side of the layer B as seen from the virtual camera 220 and is enlarged, the layer C is moved to a predetermined position on the far side of the layer B as seen from the virtual camera 220 and is reduced, and a depth test (Z test) using a depth buffer (Z buffer) is executed, thus performing drawing. In FIG. 6, the area 231 shows what size the range corresponding to the area 231 in FIG. 5 has as a result of enlargement of the layer A. In FIG. 6, the area 232 shows what size the range corresponding to the area 232 in FIG. 5 has as a result of reduction of the layer C. An area 241 is an area, of the layer A, whose image is taken by the virtual camera 220, and an area 242 is an area, of the layer C, whose image is taken by the virtual camera 220.

In a case of side-scrolling the layers A to C, it is conceivable that the scrolling is expressed by the virtual camera being moved in parallel. At this time, in a case of perspective projection, a layer on a nearer side appears to be side-scrolled faster. Also in the exemplary embodiment, for expressing such a sense of perspective, a layer on a nearer side is side-scrolled faster. Specifically, in drawing the game space, the positions of the layers A to C are adjusted by the vertex shader, and in the game image (see FIG. 4), the layers A to C are side-scrolled so that the layer on the nearer side appears to be side-scrolled faster. For example, in a case of moving the virtual camera in parallel, drawing is performed with the vertex positions transformed to such positions where the layer on the near side is further moved in the direction opposite to the movement direction of the virtual camera, and the layer on the far side is further moved along the movement direction of the virtual camera.

As described above, in the exemplary embodiment, in a case of drawing (taking an image of) the game space (see FIG. 5) by orthographic projection, drawing is performed such that, by the vertex shader, the layer (layer A) to be displayed as an object on the near side is moved to a predetermined position on the near side and is enlarged, and the layer (layer C) to be displayed as an object on the far side is moved to a predetermined position on the far side and is reduced. In this way, as shown in FIG. 4, the game image with a sense of depth sufficiently expressed can be displayed.

In the exemplary embodiment, physics calculation processing (physics simulation) for collision detection and the like is performed in the game space (see FIG. 5), and as described above, the transformation (enlargement, reduction, movement) described with reference to FIG. 6 is performed by the vertex shader, in drawing the game space. That is, in the exemplary embodiment, enlargement, reduction, or the like of an object is not performed in the game space. In a case of performing size change in the game space, physics calculation processing for collision detection and the like might be influenced, so that verification cost is required. However, in the exemplary embodiment, with processing in the game space kept as it is, only positions and sizes in performing drawing are changed. Thus, it is possible to display the game image with a sense of depth sufficiently expressed as shown in FIG. 4, without adjusting (correcting) the physics calculation processing.

As described above, in the exemplary embodiment, in drawing the game space (see FIG. 5), the layer (layer A) to be displayed as an object on the near side is moved to a predetermined position on the near side, and the layer (layer C) to be displayed as an object on the far side is moved to a predetermined position on the far side. Thus, work for designing (placing) objects in the game space is facilitated in development.

Figure 7:
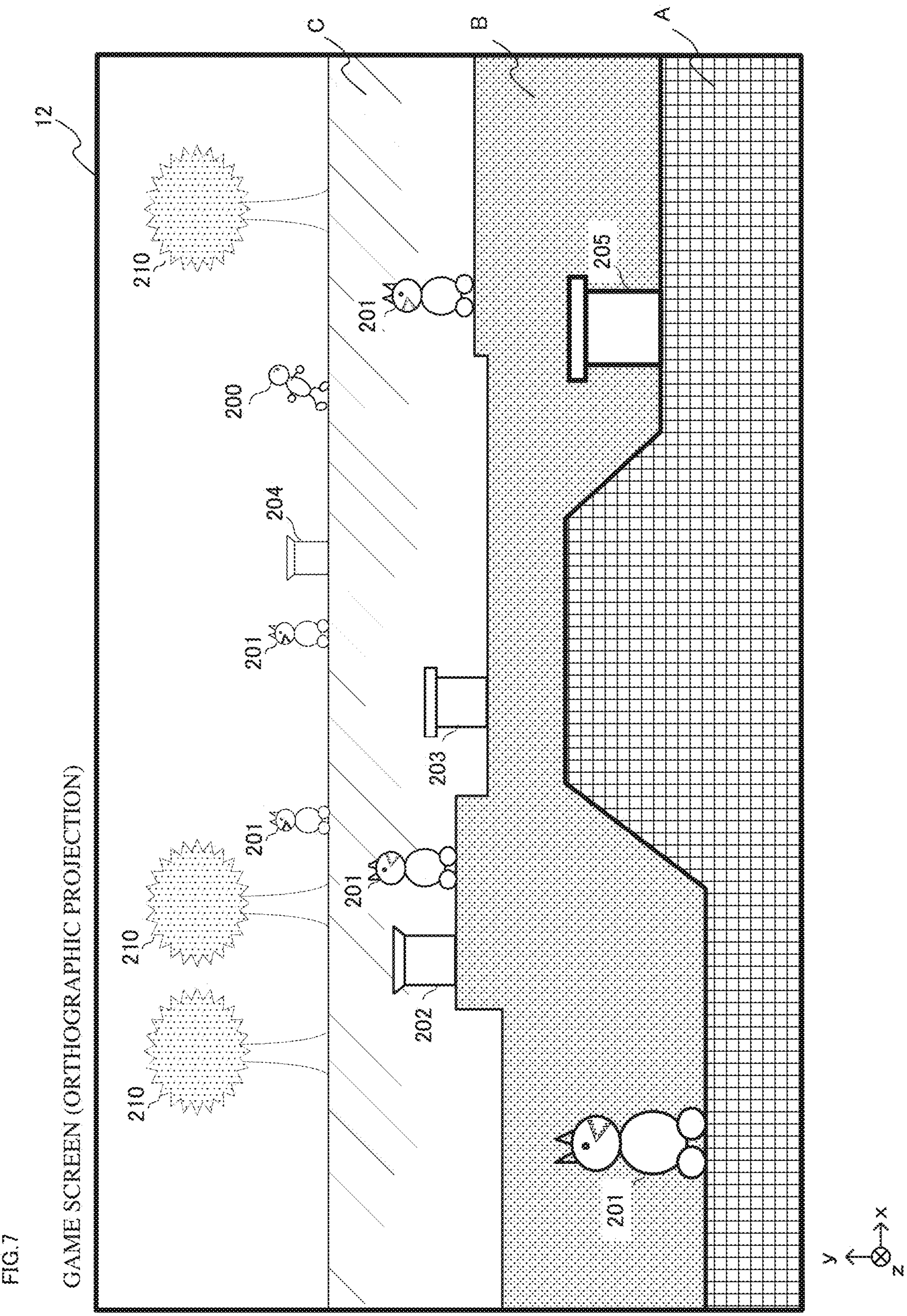
FIG. 7 illustrates a non-limiting example of a game screen.

FIG. 7 shows an example of a game screen in this game. On the game screen in FIG. 7, the player character 200 which is displayed in the layer A on the game screen in FIG. 4 is displayed in the layer C. That is, in the case of FIG. 7, the player character 200 is located in the layer C instead of the layer A in FIG. 5 and FIG. 6. Although the cases where the player character 200 is located in the layer A and the layer C are shown in FIG. 4 and FIG. 7, the player character 200 may be located in the layer B.

Figure 8:
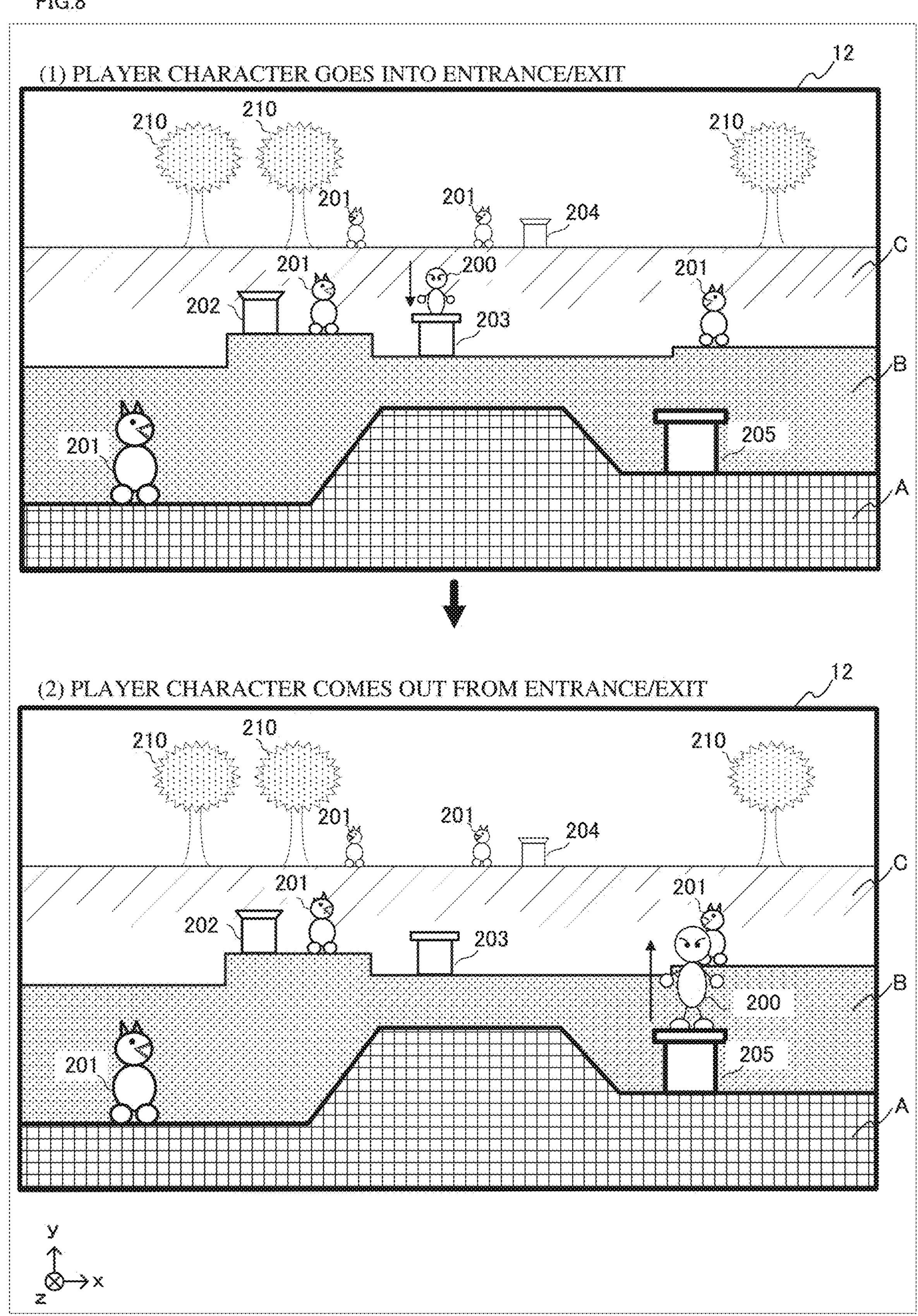
FIG. 8 illustrates a non-limiting example of a game screen.

FIG. 8 illustrates an example in which the player character 200 moves from the layer B to the layer A on the game screen in this game. As shown in FIG. 8(1), when the player character 200 displayed in the layer B goes into the entrance/exit 203 (this is an example of a case where a "second condition" is satisfied) in accordance with a player's operation, as shown in FIG. 8(2), the player character 200 comes out from the entrance/exit 205 and thus is displayed in the layer A. In addition, when the player character 200 displayed in the layer A goes into the entrance/exit 205 in accordance with a player's operation, the player character 200 comes out from the entrance/exit 203 and thus is displayed in the layer B (not shown). In this way, the player character 200 can move between the layer A and the layer B.

Figure 9:
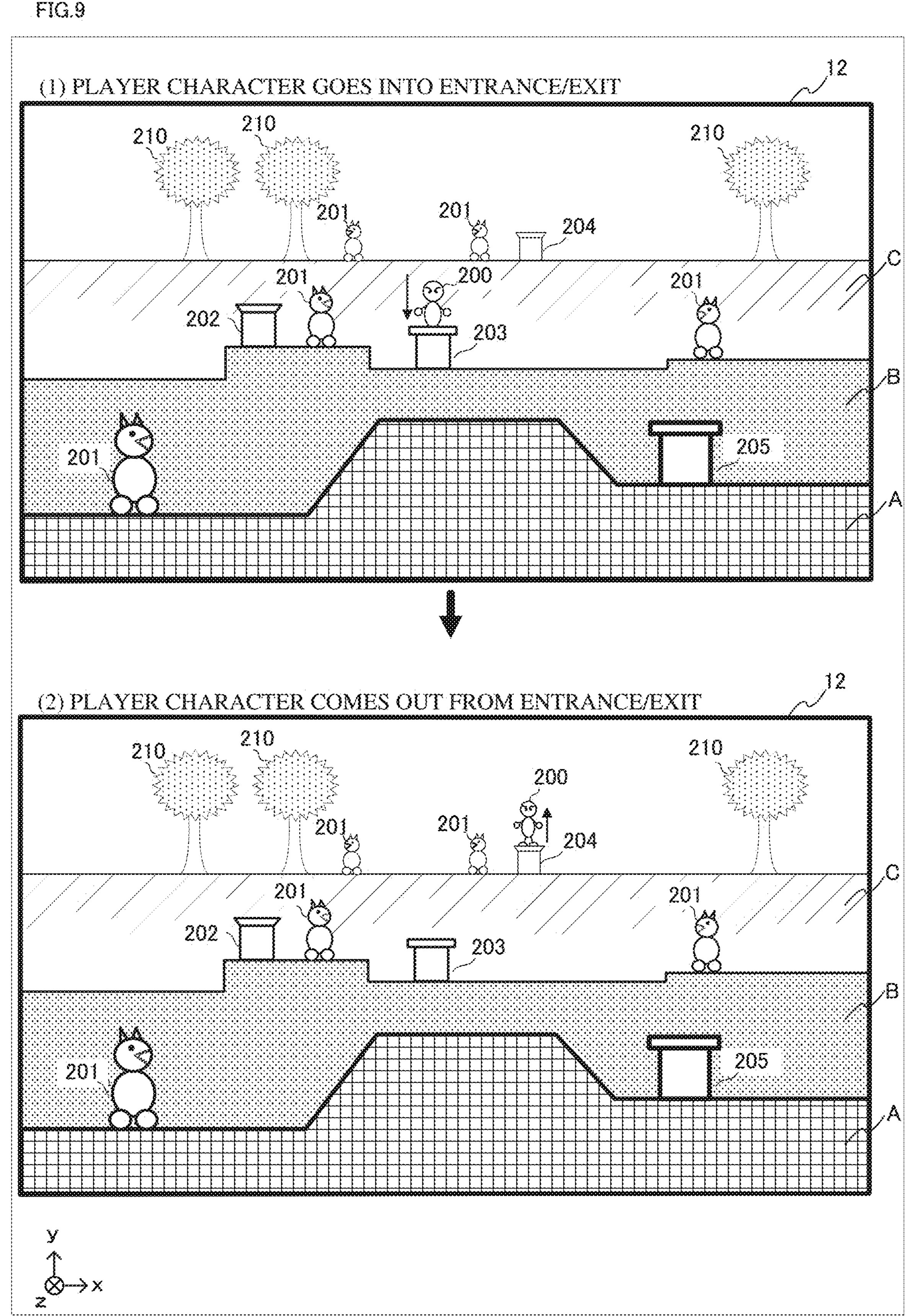
FIG. 9 illustrates a non-limiting example of a game screen.

FIG. 9 illustrates a case where the player character 200 moves from the layer B to the layer C on the game screen in this game. As shown in FIG. 9(1), when the player character 200 displayed in the layer B goes into the entrance/exit 203 (this is an example of a case where a "second condition" is satisfied") in accordance with a player's operation, as shown in FIG. 9(2), the player character 200 comes out from the entrance/exit 204 and thus is displayed in the layer C. In addition, when the player character 200 displayed in the layer C goes into the entrance/exit 204 in accordance with a player's operation, the player character 200 comes out from the entrance/exit 203 and thus is displayed in the layer B (not shown). In this way, the player character 200 can move between the layer B and the layer C. It is noted that there may be an entrance/exit that allows the player character 200 to move between the layer A and the layer C.

Figure 10:
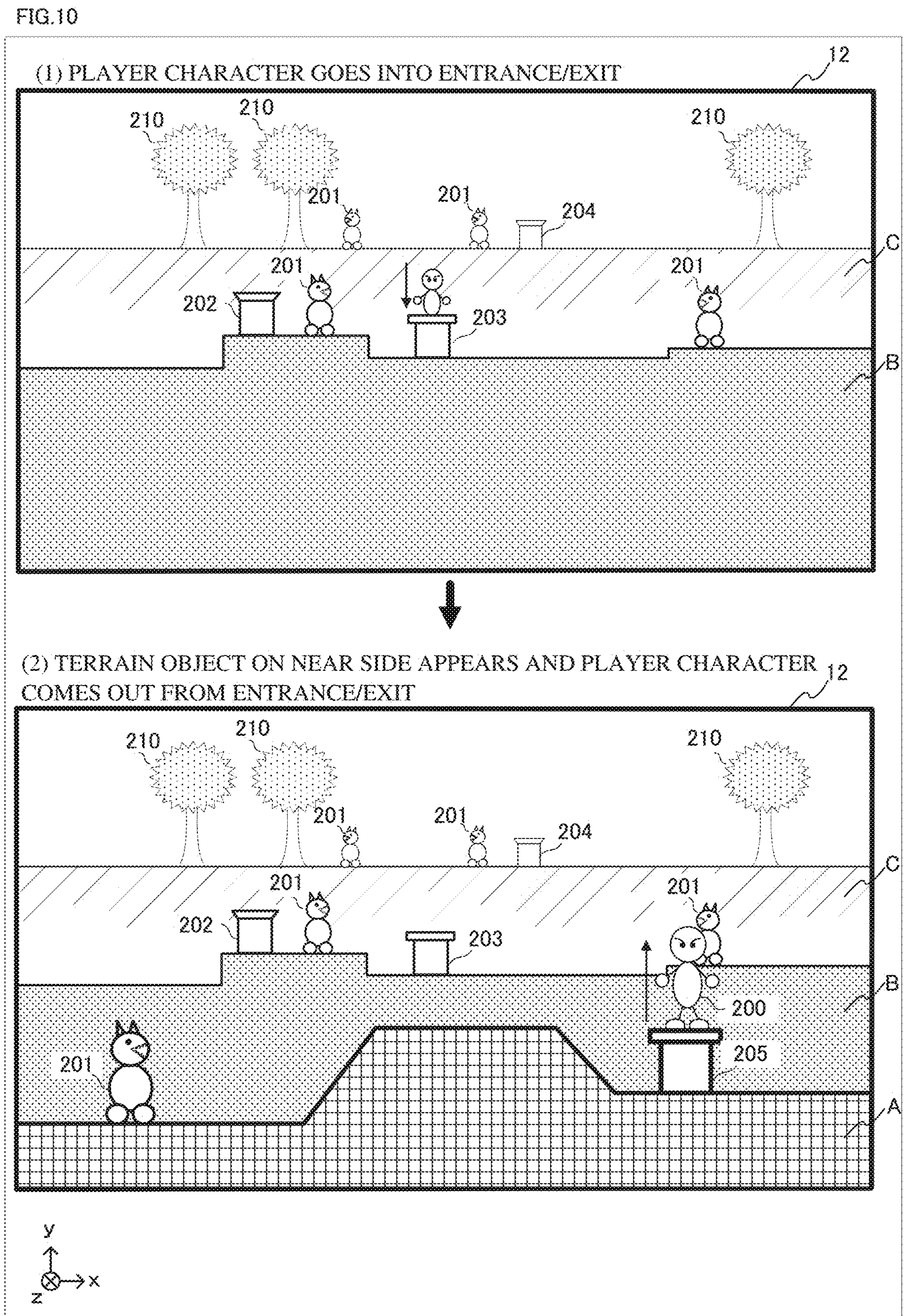
FIG. 10 illustrates a non-limiting example of a game screen.

FIG. 10 illustrates another example in which the player character 200 moves from the layer B to the layer A on the game screen in this game. In FIG. 10, as shown in (1), the layer A is not displayed on the game screen. That is, the layer A is hidden on the game screen.

Figure 11:
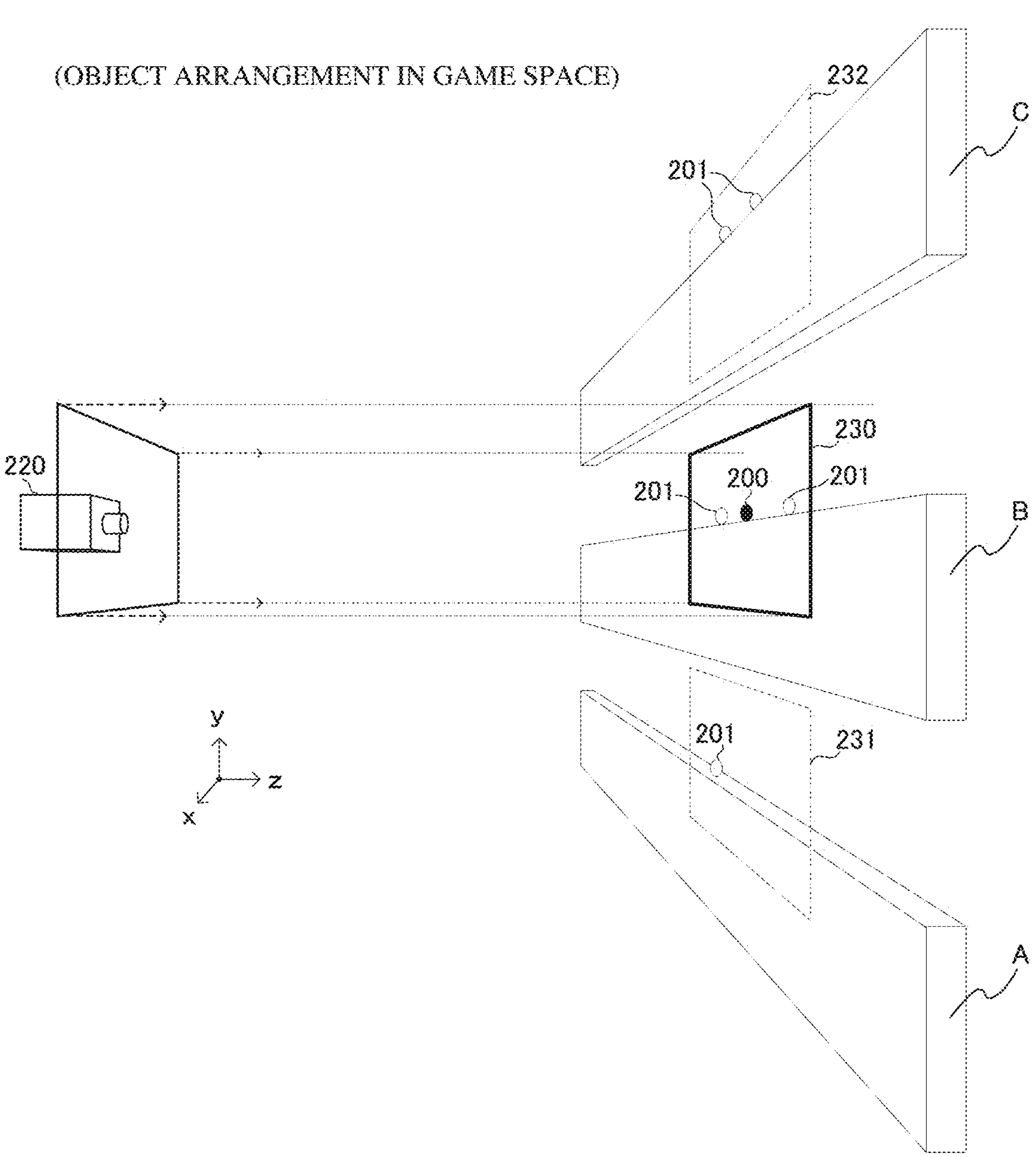
FIG. 11 illustrates a non-limiting example of a game space.

FIG. 11 illustrates a game space whose image is taken for drawing the game screen (game image) shown in FIG. 10(1). As shown in FIG. 11, in the game space, the virtual camera 220 and the objects are placed as in FIG. 5. In FIG. 11, the player character 200 is located in the layer B. FIG. 12 illustrates transformation performed by the vertex shader in drawing the game space shown in FIG. 11 (in a process of drawing). As shown in FIG. 12, in the drawing processing for the game space shown in FIG. 11, by the vertex shader, the layer C is moved to a predetermined position on the far side of the layer B as seen from the virtual camera 220 and is reduced (without executing processing of moving and enlarging the layer A (see FIG. 6)), and then a depth test using the depth buffer is executed, thus performing drawing. In this way, as shown in FIG. 10(1), the game screen is displayed with the layer A not displayed.

Then, as shown in FIG. 10(1), when the player character 200 displayed in the layer B goes into the entrance/exit 203 (this is an example of a case where a "first condition" is satisfied) in accordance with a player's operation, as shown in FIG. 10(2), the layer A appears on the near side of the layer B and then the player character 200 comes out from the entrance/exit 205 and is displayed in the layer A.

Figure 13:
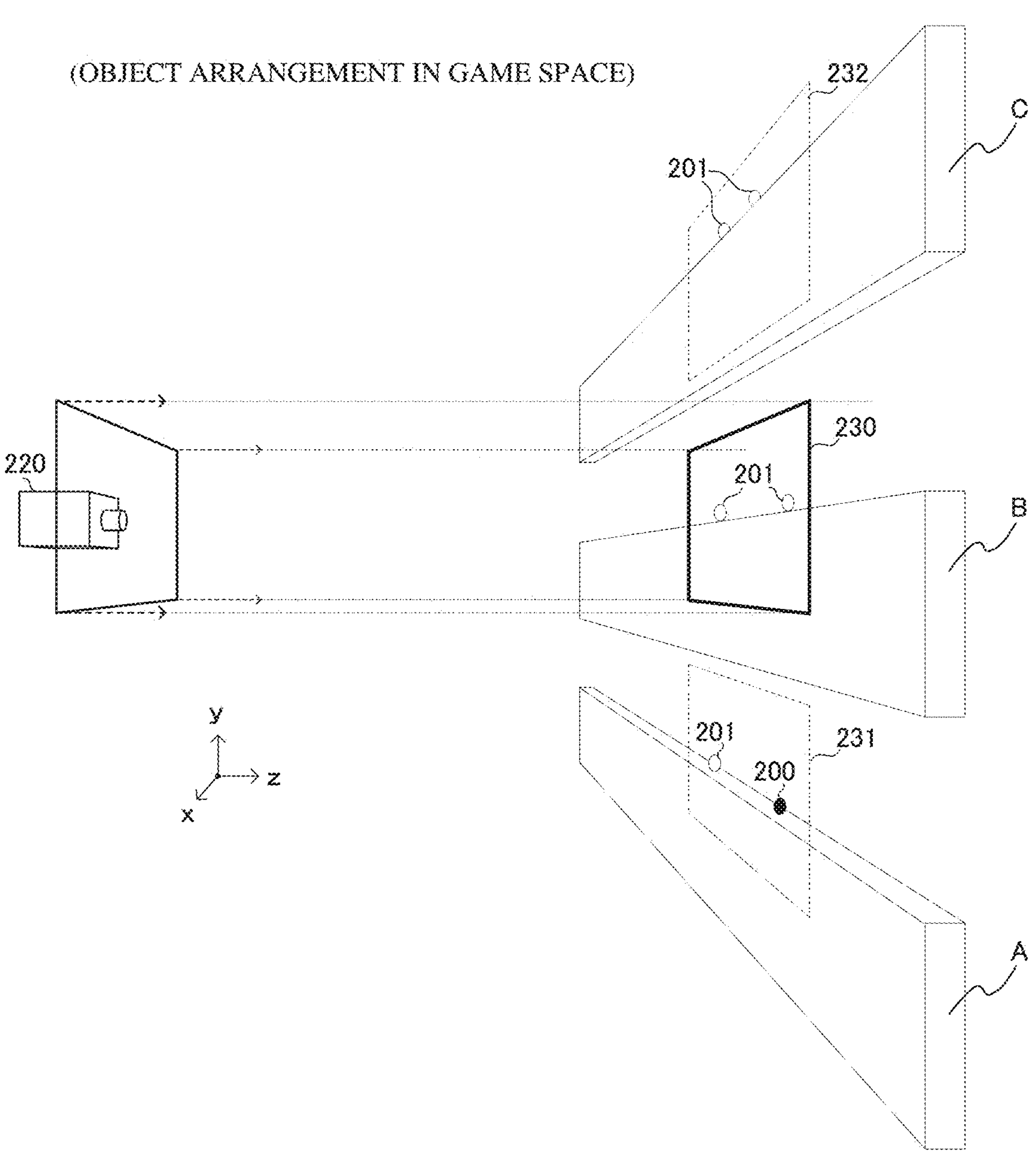
FIG. 13 illustrates a non-limiting example of a game space.

FIG. 13 illustrates a game space whose image is taken for drawing the game screen (game image) shown in FIG. 10(2). As shown in FIG. 13, in the game space, the virtual camera 220 and the objects are placed as in FIG. 5. In FIG. 13, the position of the player character 200 in the layer A is different from that in FIG. 5. FIG. 14 illustrates transformation performed by the vertex shader in drawing the game space shown in FIG. 13 (in a process of drawing). As shown in FIG. 14, in the drawing processing for the game space shown in FIG. 13, by the vertex shader, the layer A is moved to a predetermined position on the near side of the layer B as seen from the virtual camera 220 and is enlarged, the layer C is moved to a predetermined position on the far side of the layer B as seen from the virtual camera 220 and is reduced, and then a depth test using the depth buffer is executed, thus performing drawing. That is, drawing is performed in the same manner as in FIG. 6. In this way, as shown in FIG. 10(2), the game screen is displayed with the layer A appearing. In the game screen shown in FIG. 10(2), drawing processing may be performed so that the layer A appears as raising upward.

Figure 15:
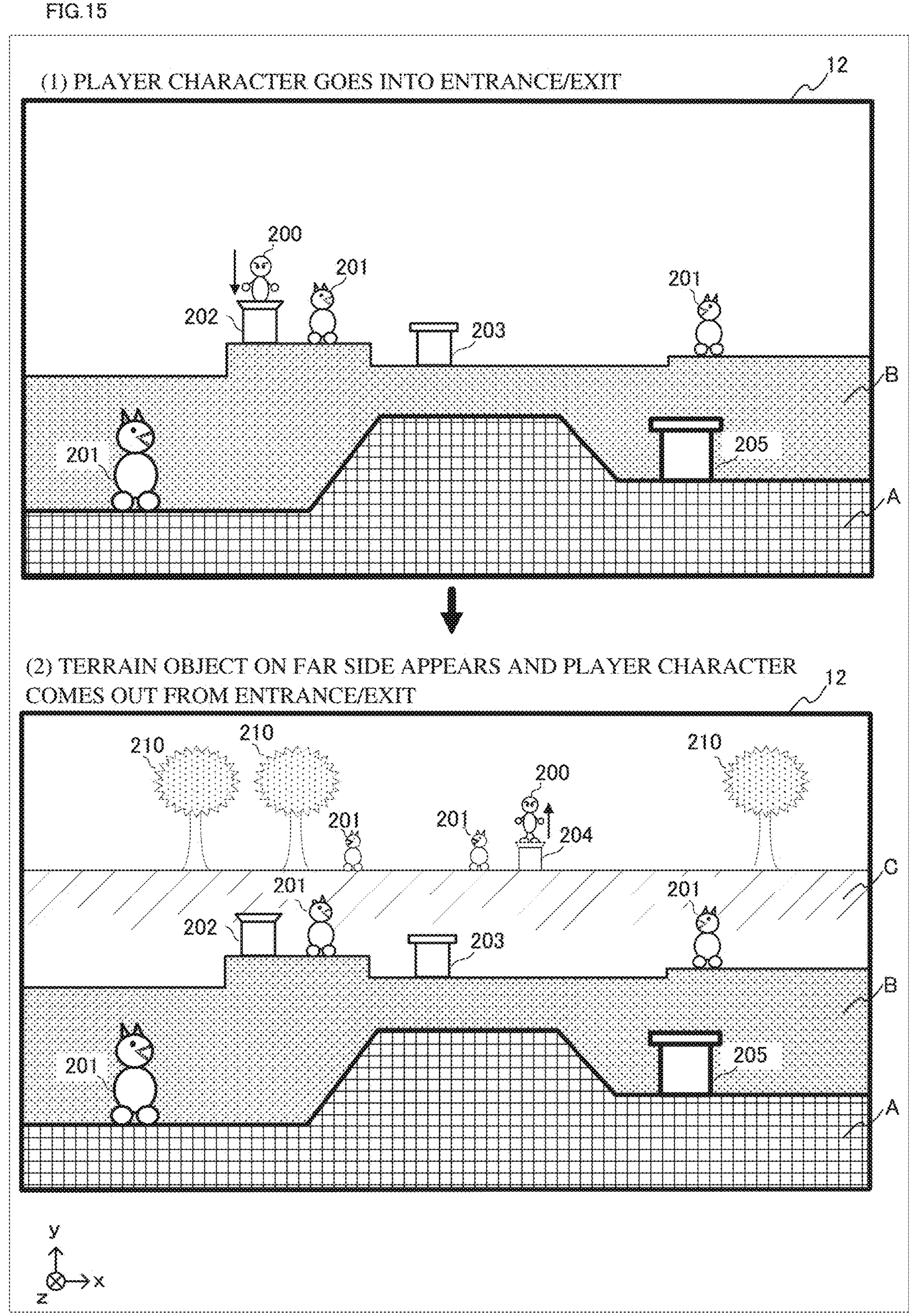
FIG. 15 illustrates a non-limiting example of a game screen.

In the above description, the case where the player character 200 moves to the hidden layer A on the near side and then the layer A appears, has been described. The same applies to a case where the player character 200 moves to the hidden layer C on the far side and then the layer C appears. FIG. 15 illustrates an example in which the player character 200 moves to the hidden layer C from the layer B on the game screen in this game. As shown in FIG. 15(1), the game screen is displayed such that, when the player character 200 goes into the entrance/exit 202 in the layer B (this is an example of a case where the "first condition" is satisfied) in accordance with a player's operation, as shown in FIG. 15(2), the layer C appears and then the player character 200 comes out from the entrance/exit 204 in the layer C. In the case of drawing the game screen (game image) shown in FIG. 15(1), by the vertex shader, the layer A is moved to a predetermined position on the near side of the layer B as seen from the virtual camera 220 and is enlarged (without executing processing of moving and reducing the layer C (see FIG. 6)), and then a depth test using the depth buffer is executed, thus performing drawing.

Figure 16:
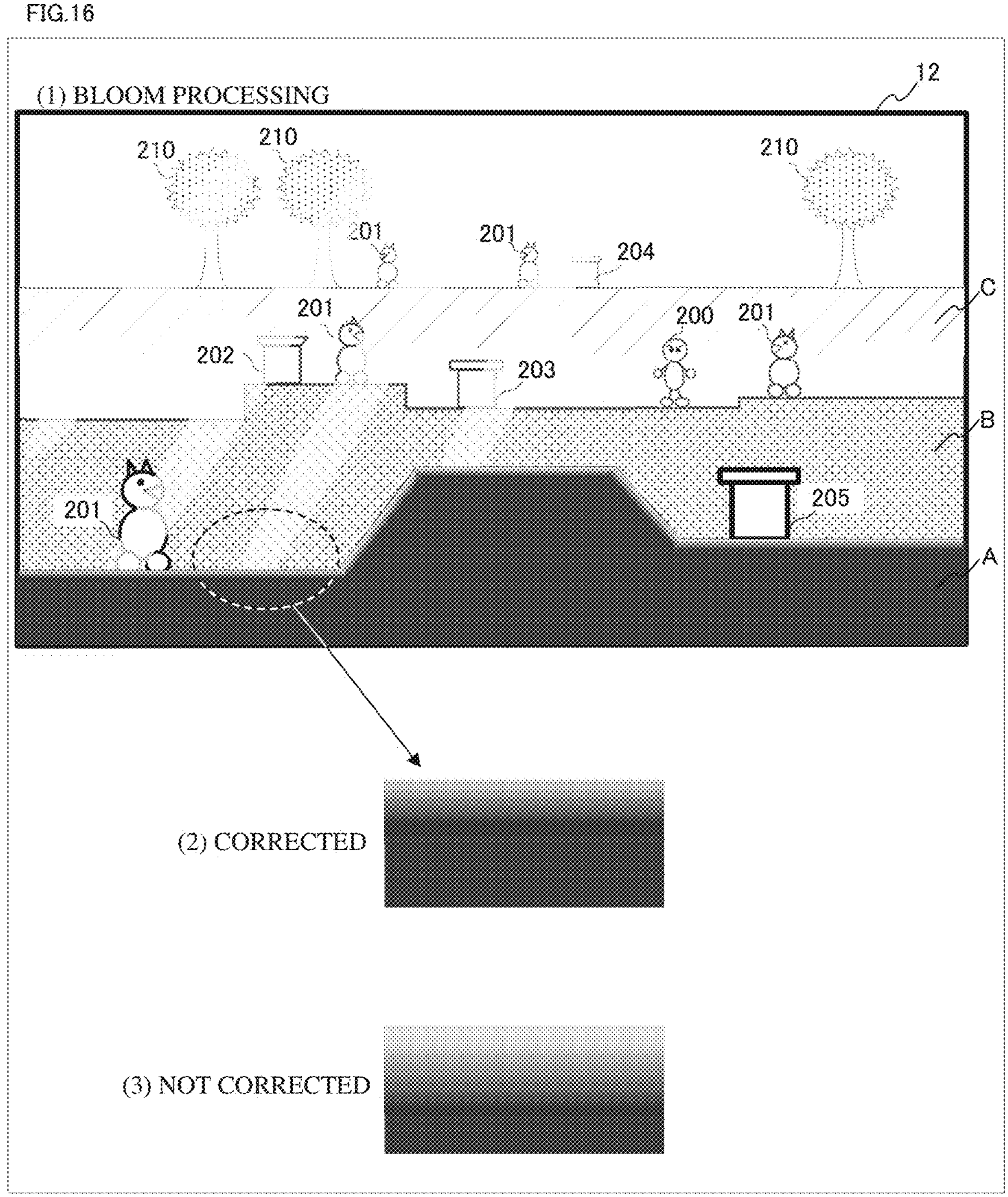
FIG. 16 illustrates a non-limiting example of a bloom effect.

FIG. 16 illustrates a case of imparting a bloom effect (an effect as if illuminating with light) to a game image in this game. In FIG. 16, for convenience sake, the layer A is colored in black.

In the exemplary embodiment, on the game image drawn in the frame buffer through transformation processing by the vertex shader as described with reference to FIG. 6, etc., the bloom effect may be imparted, with a mask set on the basis of a depth (Z value, depth value) in the depth buffer for this game image. For example, as shown in FIG. 16(1), the bloom effect is imparted, with a bloom mask set on pixels in the layer A (an example of a "first range") having a small depth in the depth buffer. Thus, as shown in FIG. 16(1), pixels in the layer B and the layer C (an example of a "second range") and pixels in an area near the boundary of the layer A where the bloom mask is set (near the boundary with the layer B in FIG. 16(1)) are imparted with the bloom effect. As a result, as shown in FIG. 16(1), pixels in the layer B and the layer C are displayed brightly as if illuminated with light, so that a sense of depth is expressed. In addition, pixels in the area near the boundary of the layer A where the bloom mask is set are imparted with a color (a color is added) as the pixels in the layer B and the like brightly illuminated with light are blurred. At this time, the color (color intensity) to be added is corrected to undergo exponentiation (or multiplication), and then the corrected color is added. Thus, pixels in the area near the boundary of the layer A where the bloom mask is set has a color (color intensity) weakened as compared to a case of not performing such correction, so that attenuation of the color (color intensity) is extremely sharpened.

The depth value for setting a mask may be any value, and may be such a value that the layer B is also targeted for a mask. In addition, it can be assumed that the depths of objects in a layer are not the same. In such a case, the depth value for setting a mask may be such a value that some objects in a layer are mask targets and the others are not mask targets. For the layer on the far side, in performing drawing, a depth whose value is increased by the vertex shader is stored in the depth buffer and therefore can become a target of bloom, so that different expressions can be performed between the far side and the near side, whereby an expression with a more increased sense of perspective can be provided.

FIG. 16(2) shows an image of an area near the boundary of the layer A in a case of performing the above correction, and FIG. 16(3) shows an image of an area near the boundary of the layer A in a case of not performing the above correction. As is found from FIG. 16(2) and FIG. 16(3), as a result of the above correction, the boundary of the layer A where the bloom mask is set becomes clear and conspicuous (stands out) and such a light emission effect that exhibits a sense of depth as if light leaks out can be provided. In FIG. 16, for convenience sake, the above correction is not shown on the enemy characters 201 and the entrance/exits 205 in the layer A (and in addition, the player character 200 in a case where the player character 200 is present in the layer A), but the above correction is performed also for these objects.

[Details of Information Processing in Exemplary Embodiment]

Figure 17:
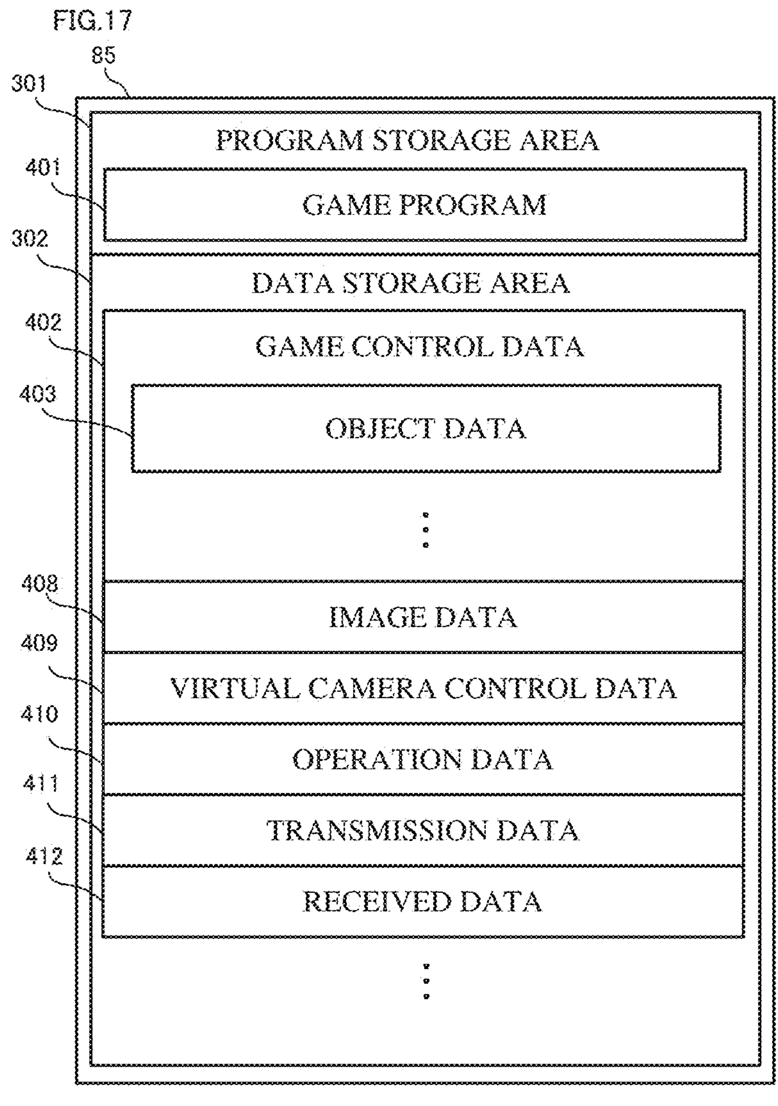
FIG. 17 shows a non-limiting example of various data stored in a DRAM 85.

Next, with reference to FIG. 17 and FIG. 18, the information processing in the exemplary embodiment will be described in detail.

[Used Data]

Various data used in this game processing will be described. FIG. 17 shows an example of data stored in the DRAM 85 of the game system 1. As shown in FIG. 17, the DRAM 85 has at least a program storage area 301 and a data storage area 302. In the program storage area 301, a game program 401 is stored. In the data storage area 302, game control data 402, image data 408, virtual camera control data 409, operation data 410, transmission data 411, received data 412, and the like, are stored. The game control data 402 includes object data 403.

The game program 401 is a game program for executing this game processing.

The object data 403 is data of objects to be placed in a virtual space and is data of objects such as a player character, enemy characters, items, grounds (terrains), blocks, rocks, stones, trees, and constructions. In addition, the object data 403 includes data of the coordinates (positions), directions, postures, states, and the like of objects.

The image data 408 is image data of backgrounds, virtual effects, and the like.

The virtual camera control data 409 is data for controlling movement of a virtual camera placed in a virtual space. Specifically, the virtual camera control data 409 is data for specifying the position, the orientation, the angle of view, the shooting direction, and the like of the virtual camera.

The operation data 410 is data indicating the contents of operations performed on the left controller 3 and the right controller 4. For example, the operation data 410 includes data indicating input states such as movements and orientation changes of the left controller 3 and the right controller 4 and the press states of the buttons. The contents of the operation data are updated at a predetermined cycle on the basis of signals from the left controller 3 and the right controller 4.

The transmission data 411 is data to be transmitted to another game system 1, and includes at least information for identifying a transmission source and the contents of the operation data 410. The transmission data 411 includes data (data indicating the coordinates (position), the posture, the state, etc.) about the own player character, and the like, to be transmitted to another game system 1 of another multi-play player (or server).

The received data 412 is data that is the transmission data received from another game system 1 and is stored in an identifiable manner for each of other game systems 1 (i.e., for each transmission source). The received data 412 includes data (data indicating the coordinates (position), the posture, the state, etc.) about another player character, received from another game system 1 of another multi-play player (or server).

In addition to the above, various data to be used in the game processing and the Drawing Processing are Stored in the DRAM 85, as Necessary.

[Details of Game Processing]

Next, with reference to flowcharts, game processing and drawing processing according to the exemplary embodiment will be described. FIG. 18 shows an example of a flowchart showing game processing and drawing processing according to the exemplary embodiment. Hereinafter, processing characteristic to the exemplary embodiment will be mainly described, and description for other matters is omitted.

Figure 18:
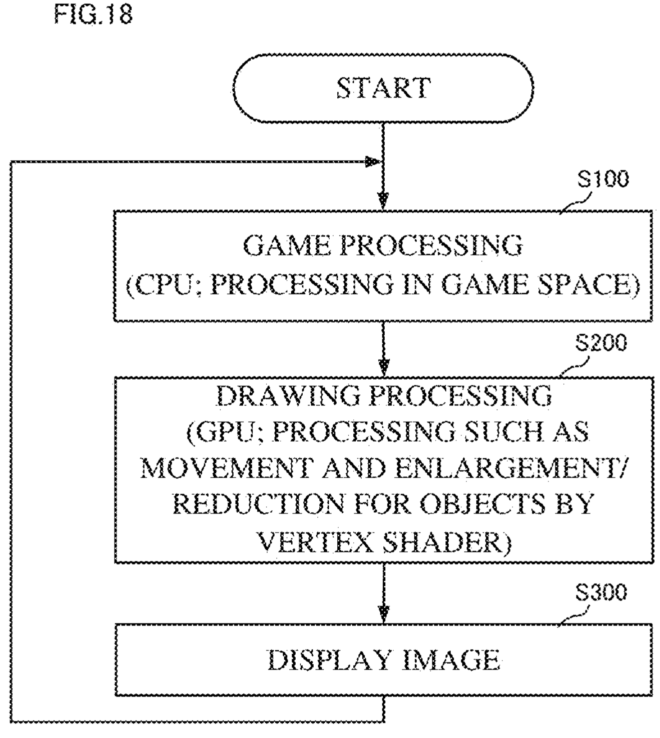

When this game processing is started, the process in the flowchart in FIG. 18 is started.

In step S100, the processor 81 (CPU function of processor 81) performs game processing in a game space. Specifically, the processor 81 performs physics calculation processing in the game space, action processing for the enemy characters 201, action processing for the player character 200 based on the operation data 410, and the like. Then, the process proceeds to step S200.

In step S200, the processor 81 (GPU function of processor 81) performs drawing processing of drawing the game space by orthographic projection, to generate a game image. Specifically, as described with reference to FIG. 4 to FIG. 7, etc., by the vertex shader, the processor 81 moves the layer (layer A) to be displayed as an object on the near side, to a predetermined position on the near side, and enlarges the layer, and moves the layer (layer C) to be displayed as an object on the far side, to a predetermined position on the far side, and reduces the layer, thus performing drawing in the frame buffer. In addition, in a case where the player character 200 moves to a hidden layer on the basis of a player's operation as described with reference to FIG. 10 to FIG. 15, etc., the processor 81 performs drawing processing of causing the hidden layer to appear on the game screen (game image). In addition, as described with reference to FIG. 16, the processor 81 performs processing of imparting a bloom effect to the game image drawn in the frame buffer through transformation processing by the vertex shader, on the basis of the depth in the depth buffer for this game image. At this time, as described with reference to FIG. 16, the processor 81 sets a bloom mask for a predetermined layer and performs predetermined correction regarding the bloom effect, for pixels in an area near the boundary of the predetermined layer. Then, the process proceeds to step S300.

In step S300, the display 12 displays the game image generated in step S200. Then, the process returns to step S100.

Through repetition of the processing in steps S100 to S300, the game space is drawn and the game image is displayed, while this game progresses. Then, if an ending condition for this game is satisfied (e.g., the player has performed an ending operation for this game), the process in the flowchart in FIG. 18 is ended.

As described above, according to the exemplary embodiment, in drawing a game image by orthographic projection, a layer to be displayed as an object on the near side is moved to a predetermined position on the near side and is enlarged, and a layer to be displayed as an object on the far side is moved to a predetermined position on the far side and is reduced, thus performing drawing in the frame buffer (see FIG. 4 to FIG. 7, etc.). Thus, according to the exemplary embodiment, the game image drawn (taken) by orthographic projection can be expressed with a sufficient sense of depth.

In addition, according to the exemplary embodiment, on the game image drawn in the frame buffer, processing of imparting a bloom effect on the basis of the depth in the depth buffer for this game image is performed, and at this time, a bloom mask is set for a predetermined layer, and predetermined correction regarding the bloom effect is performed on pixels in an area near the boundary of the predetermined layer (see FIG. 16). Thus, according to the exemplary embodiment, such a light emission effect that sufficiently exhibits a sense of depth can be provided to the game image drawn (taken) by orthographic projection.

Modifications

Figure 19:
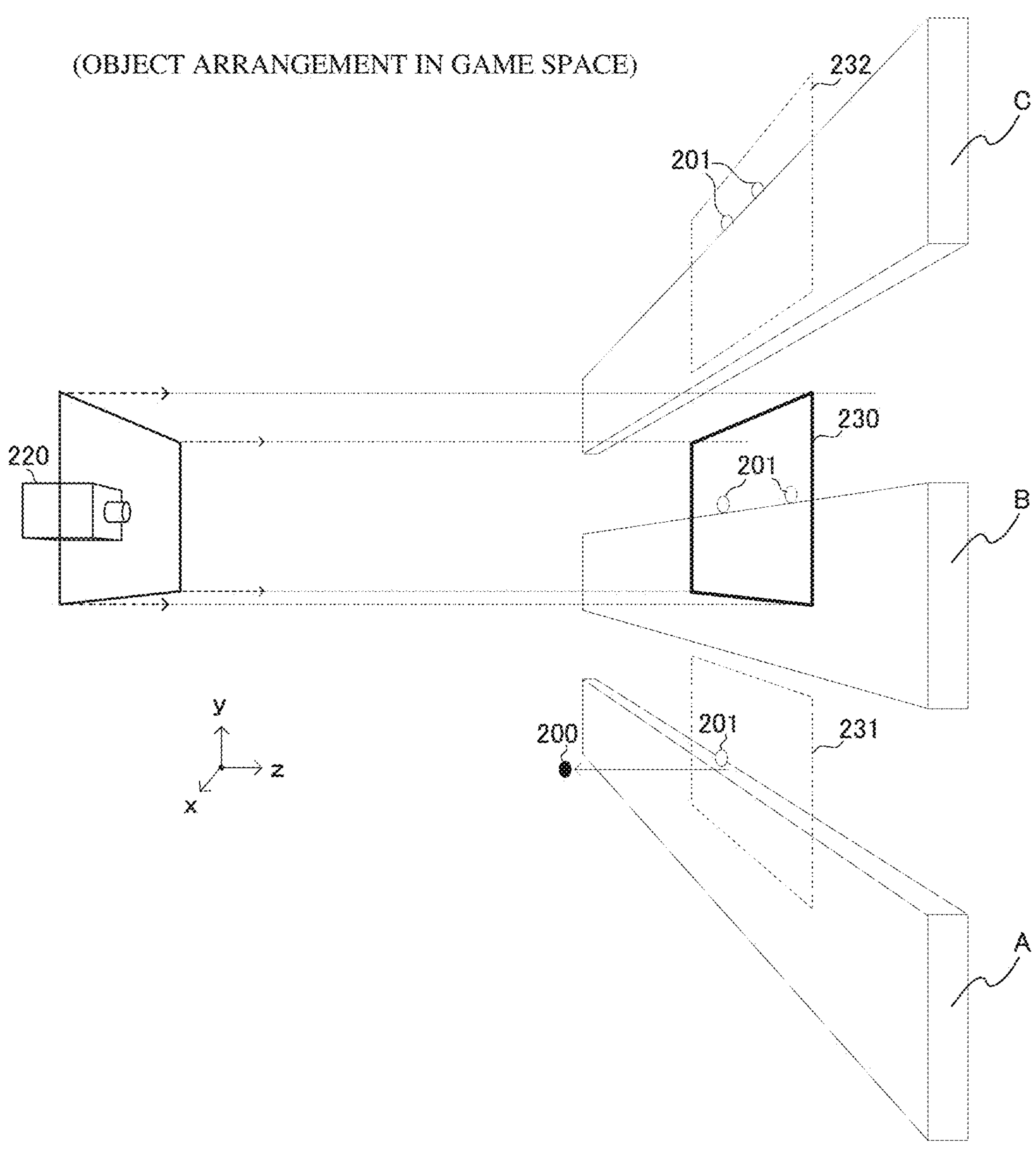
FIG. 19 illustrates a non-limiting example of a game space.

In the above exemplary embodiment, the example in which the objects (terrain object, player character, enemy character, etc.) displayed in the same layer on the game screen are placed in the same layer also in the game space and the like, has been shown (see FIG. 4 to FIG. 7, etc.). For example, the objects (terrain object, player character, enemy character, etc.) included in the layer A displayed in the game image in FIG. 4 are placed in the layer A also in the game space shown in FIG. 5 and in transformation in drawing processing shown in FIG. 6. However, for example, in the game space, an object displayed so as to be present on a terrain on the game screen may be placed in a layer different from the layer of the terrain. In an example in FIG. 19, the player character 200 displayed so as to be present on the terrain object A on the game screen (see FIG. 4) is placed on the virtual camera 220 side (near side) relative to the terrain object A, in the game space. Then, in physics calculation processing such as collision detection processing, setting (processing) is performed so as to obtain the same result as in a case where the player character 200 is present on the terrain object A. That is, the physics calculation processing is set so that the player character 200 will not fall because the terrain object A is not present under the player character 200. Then, in transformation in drawing processing, as shown in FIG. 20, both of the player character 200 and the layer A are moved to predetermined positions on the near side and are enlarged, to perform drawing in the frame buffer, whereby the same game image as in FIG. 4 can be generated.

In the above exemplary embodiment, the example in which three layers (layers A to C) are placed in the game space has been shown (see FIG. 4 to FIG. 6, etc.). However, the number of layers placed in the game space is not limited thereto.

In the above exemplary embodiment, in performing transformation by the vertex shader in the drawing processing, movement and the like are performed for layers other than the layer B, using the layer B as a reference layer for which movement and the like are not performed, to generate a game image (see FIG. 5, FIG. 6, etc.). However, without limitation thereto, for example, movement and the like may be performed for layers other than the layer A, using the layer A as a reference layer for which movement and the like are not performed, to generate a game image. In this case, such transformation that the layer B and the layer C are moved to the far side of the layer A and are reduced, is performed by the vertex shader. Alternatively, for example, movement and the like may be performed for layers other than the layer C, using the layer C as a reference layer for which movement and the like are not performed, to generate a game image. In this case, such transformation that the layer A and the layer B are moved to the near side of the layer C and are enlarged, is performed by the vertex shader.

In the above exemplary embodiment, the example in which the layers A to C are placed at the same depth position from the virtual camera 220 in the game space has been shown (see FIG. 5, etc.). However, the positions where the layers A to C are placed in the game space may be any positions as long as the positions of the layers transformed by the vertex shader (see FIG. 6) are not changed in the drawing processing. For example, in the game space shown in FIG. 5, the layer C may be placed at a position on the near side of the layer B (position on the virtual camera 220 side), and the drawing processing may be performed so that the position of the layer C transformed by the vertex shader becomes the position shown in FIG. 6 (position on the far side of the layer B), to draw a game image.

In the above exemplary embodiment, the case where the sequential processing in the game processing is executed by a single game apparatus has been described. In another exemplary embodiment, the sequential processing may be executed in an information processing system including a plurality of information processing apparatuses. For example, in an information processing system including a terminal-side apparatus and a server-side apparatus that can communicate with the terminal-side apparatus via a network, a part of the sequential processing may be executed by the server-side apparatus. In an information processing system including a terminal-side apparatus and a server-side apparatus that can communicate with the terminal-side apparatus via a network, a major part of the sequential processing may be executed by the server-side apparatus and a part of the sequential processing may be executed by the terminal-side apparatus. In the information processing system, a server-side system may include a plurality of information processing apparatuses and processing to be executed on the server side may be executed by the plurality of information processing apparatuses in a shared manner. A configuration of so-called cloud gaming may be adopted. For example, the game apparatus may transmit operation data indicating a user's operation to a predetermined server, various game processing may be executed on the server, and the execution result may be distributed as a video and a sound by streaming to the game apparatus.

While the exemplary embodiments and modifications have been described above, it is to be understood that the above description is, in all aspects, merely an illustrative example, and is not intended to limit the scope thereof. In addition, it is to be understood that various improvements and changes can be made on the exemplary embodiments and modifications.

What is claimed is:

1. A non-transitory computer-readable storage medium having stored therein instructions that, when executed by a processor of an information processing apparatus, cause the information processing apparatus to provide execution comprising:

in a virtual space where at least a player character object and terrain objects are placed, controlling at least the player character object and a virtual camera; and drawing, in a frame buffer, objects in the virtual space, on the basis of orthographic projection, and further, in a first scene in a game, drawing while performing, by a vertex shader, such transformation that, among the objects in the virtual space, at least the player character object and one or more of the terrain objects are moved to a near side in a depth direction and are enlarged, or are moved to a far side in a depth direction and are reduced.

2. The non-transitory computer-readable storage medium according to claim 1, wherein the instructions cause the information processing apparatus to provide execution comprising:

causing a first terrain object to appear in a case where a first condition in the game is satisfied on the basis of control for the player character object; and in the first scene that is a subsequent scene, drawing while performing the transformation for the player character object and the first terrain object.

3. The non-transitory computer-readable storage medium according to claim 1, wherein the instructions cause the information processing apparatus to provide execution comprising:

drawing, in the frame buffer, the objects in the virtual space, on the basis of orthographic projection, and further, drawing while performing the transformation for a second terrain object among the objects in the virtual space;

moving the player character object in a case where a second condition in the game is satisfied on the basis of control for the player character object; and in the first scene that is a subsequent scene, further drawing while performing the transformation for the player character object.

4. The non-transitory computer-readable storage medium according to claim 1, wherein the instructions cause the information processing apparatus to provide execution comprising:

drawing, in the frame buffer, the objects in the virtual space, while performing a depth test; and on an image drawn in the frame buffer, further imparting, on the basis of a depth in a depth buffer, a predetermined effect based on a pixel in a second range excluding a first range in which the depth is small.

5. The non-transitory computer-readable storage medium according to claim 4, wherein the predetermined effect includes a bloom effect.

6. The non-transitory computer-readable storage medium according to claim 5, wherein the instructions cause the information processing apparatus to provide execution comprising:

in a case of adding a color to a pixel in the first range by the bloom effect based on the pixel in the second range, correcting the color to be added, on the basis of at least exponentiation, and then adding the corrected color.

7. A game processing system, comprising:

a processor; and a memory storing computer readable instructions that, when executed by the processor, cause the game processing system to at least:

in a virtual space where at least a player character object and terrain objects are placed, control at least the player character object and a virtual camera; and draw, in a frame buffer, objects in the virtual space, on the basis of orthographic projection, and further, in a first scene in a game, draw while performing, by a vertex shader, such transformation that, among the objects in the virtual space, at least the player character object and one or more of the terrain objects are moved to a near side in a depth direction and are enlarged, or are moved to a far side in a depth direction and are reduced.

8. The game processing system according to claim 7, wherein the game processing system is further caused to:

cause a first terrain object to appear in a case where a first condition in the game is satisfied on the basis of control for the player character object; and in the first scene that is a subsequent scene, draw while performing the transformation for the player character object and the first terrain object.

9. The game processing system according to claim 7, wherein the game processing system is further caused to:

draw, in the frame buffer, the objects in the virtual space, on the basis of orthographic projection, and further, draw while performing the transformation for a second terrain object among the objects in the virtual space;

move the player character object in a case where a second condition in the game is satisfied on the basis of control for the player character object; and in the first scene that is a subsequent scene, further draw while performing the transformation for the player character object.

10. The game processing system according to claim 7, wherein the game processing system is further caused to:

draw, in the frame buffer, the objects in the virtual space, while performing a depth test; and on an image drawn in the frame buffer, further impart, on the basis of a depth in a depth buffer, a predetermined effect that is based on a pixel in a second range excluding a first range in which the depth is small.

11. The game processing system according to claim 10, wherein the predetermined effect includes a bloom effect.

12. The game processing system according to claim 11, wherein the game processing system is further caused to:

in a case of adding a color to a pixel in the first range by the bloom effect based on the pixel in the second range, correct the color to be added, on the basis of at least exponentiation, and then add the corrected color.

13. A game processing apparatus, comprising:

processing circuitry including at least one processor; and a display, wherein the processing circuitry is configured to:

in a virtual space where at least a player character object and terrain objects are placed, control at least the player character object and a virtual camera; and draw, in a frame buffer, objects in the virtual space, on the basis of orthographic projection, and further, in a first scene in a game, draw while performing, by a vertex shader, such transformation that, among the objects in the virtual space, at least the player character object and one or more of the terrain objects are moved to a near side in a depth direction and are enlarged, or are moved to a far side in a depth direction and are reduced.

14. The game processing apparatus according to claim 13, wherein the processing circuitry is further configured to:

cause a first terrain object to appear in a case where a first condition in the game is satisfied on the basis of control for the player character object; and in the first scene that is a subsequent scene, draw while performing the transformation for the player character object and the first terrain object.

15. The game processing apparatus according to claim 13, wherein the processing circuitry is further configured to:

draw, in the frame buffer, the objects in the virtual space, on the basis of orthographic projection, and further, draw while performing the transformation for a second terrain object among the objects in the virtual space;

move the player character object in a case where a second condition in the game is satisfied on the basis of control for the player character object; and in the first scene that is a subsequent scene, further draw while performing the transformation for the player character object.

16. The game processing apparatus according to claim 13, wherein the processing circuitry is further configured to:

draw, in the frame buffer, the objects in the virtual space, while performing a depth test; and on an image drawn in the frame buffer, further impart, on the basis of a depth in a depth buffer, a predetermined effect based on a pixel in a second range excluding a first range in which the depth is small.

17. The game processing apparatus according to claim 16, wherein the predetermined effect includes a bloom effect.

18. The game processing apparatus according to claim 17, wherein the processing circuitry is further configured to:

in a case of adding a color to a pixel in the first range by the bloom effect that is based on the pixel in the second range, correct the color to be added, on the basis of at least exponentiation, and then add the corrected color.

19. An information processing method executed by a processor configured to control a game processing system, the information processing method comprising:

in a virtual space where at least a player character object and terrain objects are placed, controlling at least the player character object and a virtual camera; and drawing, in a frame buffer, objects in the virtual space, on the basis of orthographic projection, and further, in a first scene in a game, drawing while performing, by a vertex shader, such transformation that, among the objects in the virtual space, at least the player character object and one or more of the terrain objects are moved to a near side in a depth direction and are enlarged, or are moved to a far side in a depth direction and are reduced.

20. The game processing method according to claim 19, further comprising:

causing a first terrain object to appear in a case where a first condition in the game is satisfied on the basis of control for the player character object; and in the first scene that is a subsequent scene, drawing while performing the transformation for the player character object and the first terrain object.

21. The game processing method according to claim 19, further comprising:

drawing, in the frame buffer, the objects in the virtual space, on the basis of orthographic projection, and further, drawing while performing the transformation for a second terrain object among the objects in the virtual space;

moving the player character object in a case where a second condition in the game is satisfied on the basis of control for the player character object; and in the first scene that is a subsequent scene, further drawing while performing the transformation for the player character object.

22. The game processing method according to claim 19, further comprising:

drawing, in the frame buffer, the objects in the virtual space, while performing a depth test; and on an image drawn in the frame buffer, further imparting, on the basis of a depth in a depth buffer, a predetermined effect based on a pixel in a second range excluding a first range in which the depth is small.

23. The game processing method according to claim 22, wherein the predetermined effect includes a bloom effect.

24. The game processing method according to claim 23, further comprising:

in a case of adding a color to a pixel in the first range by the bloom effect based on the pixel in the second range, correcting the color to be added, on the basis of at least exponentiation, and then adding the corrected color.

* * * * *